Office

Office

Station

Station

INVENTOR
Arthur P. Jackel.
HIS ATTORNEY

Patented Nov. 19, 1946

2,411,375

UNITED STATES PATENT OFFICE 2,411,375

REMOTE CONTROL SYSTEM

Arthur P. Jackel, Penn Township, Allegheny County, Pa., assignor to The Union Switch & Signal Company, Swissvale, Pa., a corporation of Pennsylvania Application July 31, 1943, Serial No. 496,907

16 Claims. (Cl. 177—353)

My invention relates to remote control systems, and more particularly to centralized traffic control systems for railroads comprising an office and a plurality of stations connected by line wires over which impulse code signals are transmitted to effect the operation of traffic governing devices located along the trackway, and to indicate the condition of such devices at the office.

The system of my invention is of the time code type, employing codes of long and short elements which are transmitted one at a time over a single line circuit, and is based upon the system shown in Letters Patent of the United States No. 2,229,249, granted January 21, 1941, to L. V. Lewis, for Remote control systems. My system includes also certain improvements upon the system of this patent relating to the use of a central battery line circuit of the bridged type first shown in Letters Patent of the United States No. 2,303,875, granted December 1, 1942, to G. W. Baughman and N. F. Agnew, for Remote control systems in order to permit the joint use of the same line wires by the centralized traffic control system and by other communication facilities.

Certain features of my invention disclosed but not claimed herein, are claimed in my divisional applications, Serial No. 554,199, filed September 15, 1944, for Selective receiver for remote control systems, now Patent No. 2,381,499, issued August 7, 1945, and Serial No. 554,200, filed September 15, 1944, for Transmitting apparatus for remote control systems, now Patent 2,393,377, issued Jan. 22, 1946.

The components of the system of my invention are preferably assembled in the form of coding and storage units each containing a group of relays. The system employs a station coding unit at each field location for transmitting indication codes and for selectively receiving control codes, together with a station storage unit for each unit group of controlled traffic governing devices, for associating such devices with the station coding unit. The office equipment preferably includes an individual control panel for each unit group of controlled traffic governing devices, and an office coding unit which is connected over the line circuit with the station coding units to establish communication selectively between each panel and the corresponding station storage unit.

One feature of my invention is the provision of an improved station storage unit requiring fewer relays than heretofore, due to the provision of a pair of register relays which are operated alternately and repeatedly to register the character of a series of code elements, in place of a series of register relays, one for each element, as used heretofore.

Another feature of my invention relates to improved arrangements for associating additional station storage units with the same coding unit, reducing the number of relays required when the number of controlled devices at a location is larger than can be controlled and indicated by a single composite code. A limited number of storage units may be connected directly to the station coding unit, as heretofore, and in addition, auxiliary groups of selecting relays, designated "pyramid" units, may be interposed to afford connections for additional storage units, only one station coding unit being required at a location even though the number of controlled devices is sufficient to absorb the entire capacity of the system.

Another feature of my invention comprises the provision of a starting relay of the normally energized type in each station storage unit which takes the place of two relays as required heretofore, and is also more efficient in operation.

My invention as arranged for the indication of train movements includes an improved "track OS storage" feature for insuring the transmission of an indication of a train movement through a particular track section even though the line circuit is not available when the train movement takes place.

The system of my invention also includes numerous circuit improvements whereby the timing of the relays which measure the lengths of the code elements is more accurately controlled, as will hereinafter be pointed out, thereby increasing the margin of reliability of the system, and causing it to function properly through a wider range of variation of local battery voltage.

Another feature of my invention relates to improved arrangements for effecting joint operation over a line circuit which is used for the operation of telephone call selectors, without interference.

Another feature of my invention relates to provisions at the office for preventing the further reception of a code containing a manifest error, such as might occur due to a fault when two stations attempt to transmit different code calls at the same time.

Other features, purposes and objects of my invention will be pointed out as the description proceeds.

One form of apparatus embodying my invention and several modifications thereof will now be described and the novel features thereof will then be pointed out in claims.

Referring to the accompanying drawings, Figs. 1A, 1B and 1C, taken together, illustrate in condensed form the office equipment employed in one form of centralized traffic control system embodying my invention. The apparatus of Figs. 1A and 1B comprises the office coding unit for generating and delivering control codes to the line circuit, and for receiving indication codes. Fig. 1C shows an individual panel containing the levers and lamps for controlling and indicating a typical unit group of traffic governing devices in the field, together with the selecting relays for associating the one panel with the office coding unit. It is to be understood that each panel is similarly connected but by means of a different arrangement of selecting relays.

Figs. 2A, 2B and 2C, taken together, illustrate the corresponding apparatus at a typical field location arranged as required when there is but one unit group of controlled devices at the location. The apparatus of Figs. 2A and 2B, together with the left-hand portion of Fig. 2C, comprises the station coding unit, while the right-hand portion of Fig. 2C shows the relays of a station storage unit suitable for the control of a typical group of traffic governing devices. Fig. 2C also includes a track diagram illustrating such a group, which as shown, includes a power operated track switch and a group of signals such as are commonly associated with one end of a passing siding on a single track railway. It is to be understood that the portion of the coding unit shown in Fig. 2C is arranged to provide connections for from one to five station storage units, such as the one shown.

Similar reference characters refer to similar parts in each of the several views.

Figure 1A:
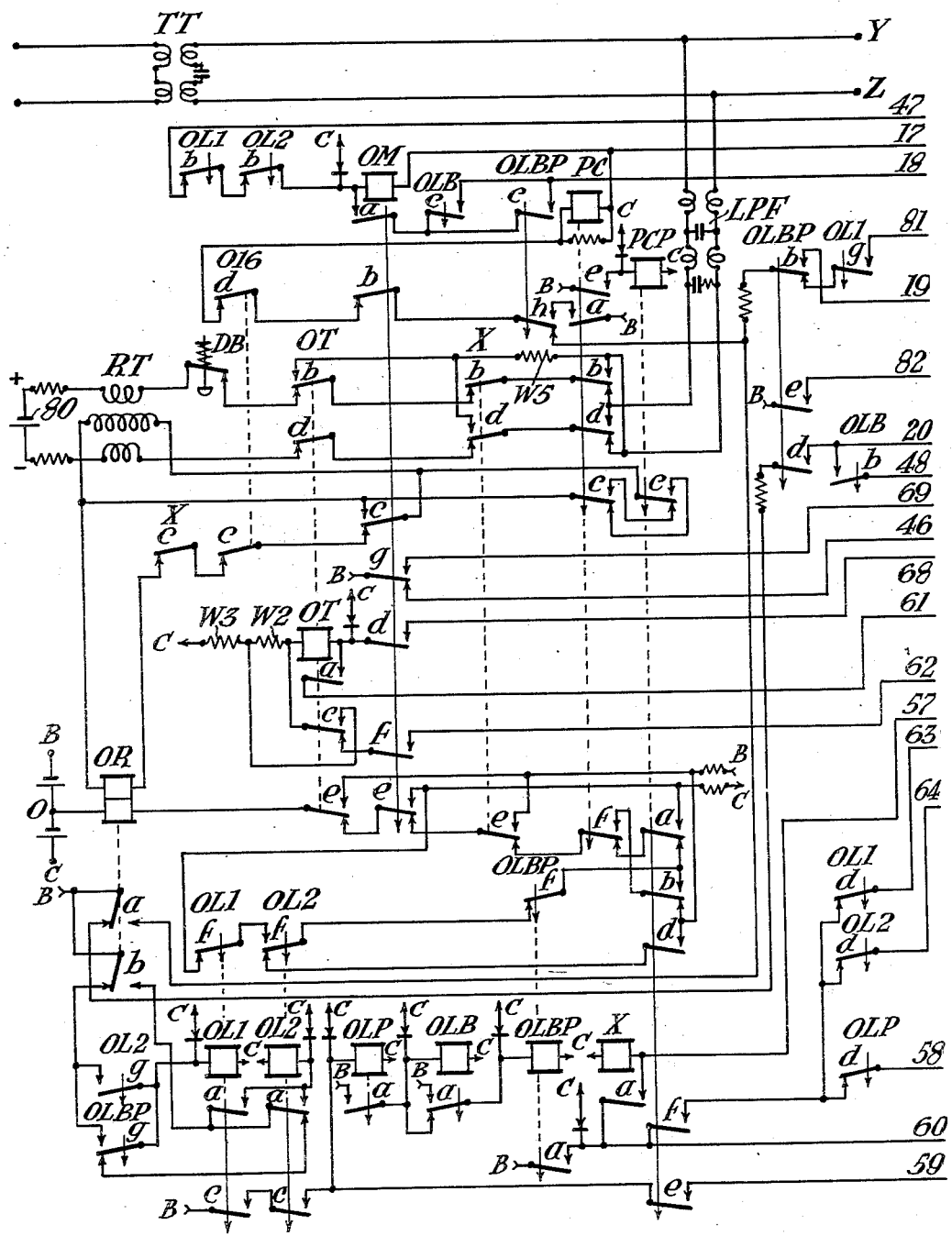
Figure 2A:
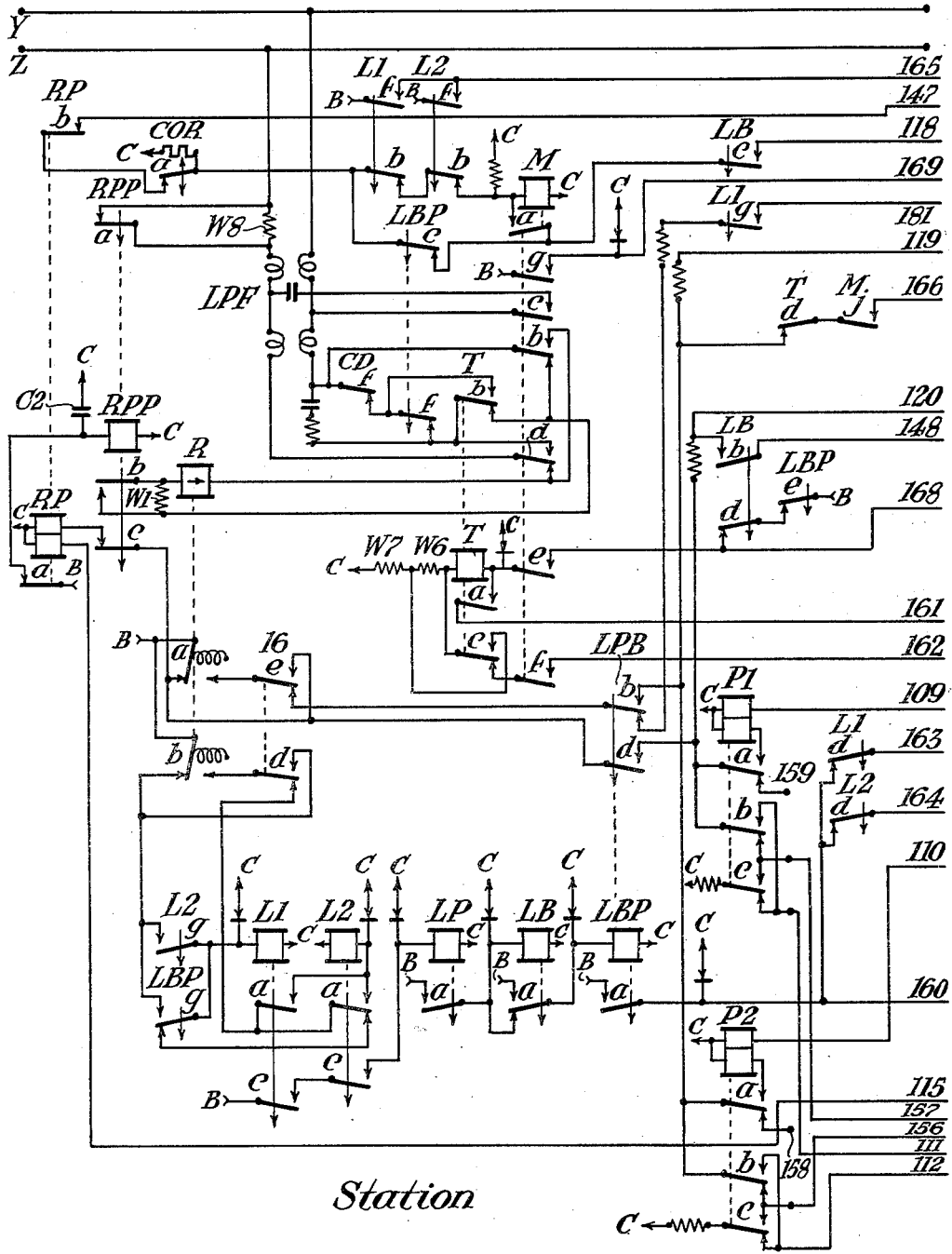

Referring to Fig. 1A, the reference characters Y and Z designate a pair of line wires which extend from the office through the several stations and provide a line circuit for the centralized traffic control system of my invention and also may be used to provide channels for telephone and telegraph communication, as explained in connection with the similarly designated line wires shown in the Baughman et al. Patent No. 2,303,875. This line circuit, as shown, is normally energized by current from the office line battery 80, the positive terminal of which is normally connected to line wire Y and the negative terminal to line wire Z over back contacts $b$ and $d$ of a pole changer relay PC and of the office transmitter relay OT and the coils of a suitable low pass filter LPF; and control codes are transmitted by opening and closing the line circuit by operating relay OT periodically. The circuit also includes back contacts $b$ and $d$ of a lockout relay X, provided in accordance with a feature of my invention, and in addition, the primary windings of an impulse transformer RT, by means of which the office line relay OR is controlled when receiving indication codes, and the normally closed contact of a disconnect button DB by means of which the line may be opened manually. Relay OR is of the stick polar type, as described and claimed in Patent No. 2,303,875, and responds to impulses of alternately opposite polarity delivered by transformer RT when the line current is varied by the operation of a station transmitter relay T, such as is shown in Fig. 2A. Indication codes are transmitted by operating relay T to connect the line wires together periodically through an impedance of relatively low value in comparison with the normal impedance of the line circuit, comprising the coils of a low pass filter LPF similar to the one at the office, which is interposed between the line and the station apparatus.

At each field station, as shown in Fig. 2A, a high resistance line relay R is connected across the line wires Y and Z in series with a resistor W1, the connection normally including back contacts $b$ and $d$ of a master relay M and the coils of the low pass filter LPF. The station line relays R are of the biased polar type and are normally energized, in parallel, by current supplied by battery 80, each relay R closing its left-hand contacts $a$ and $b$, as shown, when its left-hand terminal is positive, and closing its right-hand contacts $a$ and $b$ when energized in the reverse direction with its right-hand terminal positive, or when deenergized. The connection of the station apparatus to the line wires Y and Z is controlled by a fault relay RPP in a manner hereinafter pointed out, but as this relay is not involved in the normal operation of the system it may be assumed for the present to remain in its normal energized position as shown.

Each station line relay R controls a group of slow release timing relays L1, L2, LP, LB and LBP. These timing relays are normally deenergized and are controlled by relay R to govern the transmission and reception of codes in accordance with line conditions like the similarly designated relays of Patent No. 2,229,249, hereinbefore referred to. Their release times are likewise governed by electronic rectifiers, as shown, the rectifiers also serving to prevent contact sparking and to minimize contact wear, as explained in this patent.

The system of my invention is arranged to employ codes each having sixteen steps, and in each control code delivered by the office transmitter relay OT, the line circuit is open during each odd-numbered step and closed during each even-numbered step. More particularly, the office coding unit is placed in condition to transmit a control code by energizing the master relay OM of Fig. 1A, which completes circuits for effecting the periodic operation of the associated transmitter relay OT to open and close the line circuit to operate the line relays R at all stations in unison, both the open and closed periods constituting code elements.

When the line circuit is opened to begin the first element of a code, each line relay R releases and its right-hand contact $b$ completes a circuit from the positive or supply terminal B of a suitable local source of current over a back contact $d$ of relay 16, back contact $a$ of relay L2, back contact $g$ of relay LBP through relay L1 to the negative or common return terminal C of the source. Relay L1 then picks up and its front contact $a$ completes a circuit from terminal B at the right-hand contact $b$ of relay R through relay L2 to terminal C, so that relay L2 picks up, completing a stick circuit at its own front contact $a$ and also completing a circuit from terminal B over front contacts $c$ of relays L1 and L2 to pick up relay LP, which relay in turn completes circuits over its front contact $a$ to pick up relays LB and LBP. Relay LBP becomes energized in tandem with relay LB when the latter closes its front contact $a$ so that these relays release successively after relay LP is released. When relay L2 picks up on the first step of a code, its contacts $a$ and $g$ shift the connections of relay L1 from the right-hand to the left-hand contact $b$ of relay R, and then contact $g$ of relay LBP is picked up to maintain the latter connection until the code is terminated. It follows that relays L1 and L2 are energized alternately, relay L1 over the left-hand contact $b$ of relay R, and relay L2 over the right-hand contact $b$ of relay R, in response to the periodic operation of relay R. Relays L1 and L2 remain picked up for the duration of short code elements, relay L1 releasing during each odd-numbered long element and relay L2 during each even-numbered long element. These relays serve, therefore, to indicate code character in a received code, and together with relay LP they serve to control the lengths of the long steps of a code generated by the associated transmitter relay T. Relay LB and its repeater relay LBP are bridging relays which remain picked up for the duration of a code and serve to prepare various local circuits when the code operation of relay R begins and to open them when it ceases.

The office line relay OR, Fig. 1A, controls a similar group of timing relays OL1, OL2, OLP, OLB and OLBP, which function in a similar manner. Relay OR, however, is normally deenergized and is adapted to hold its contacts in either position to which it is operated by a momentary impulse, and hence it may become accidentally reversed. If this occurs, relay OR is restored automatically to normal by the action of the timing relays in a manner hereinafter explained, and it may be assumed therefore that relay OR, although deenergized, occupies its normal position corresponding to that of the normally energized station line relays R, when the system is in its normal at rest condition.

When receiving indication codes, relay OR is operated by impulses of alternately opposite polarity delivered by transformer RT. During the transmission of control codes the master relay OM, Fig. 1A, is held energized and its contact $c$ short circuits transformer RT and disconnects it from relay OR, and relay OR is then operated locally by the transmitter relay OT. When relay OM picks up, relay OR becomes energized in the normal direction, as shown, over the circuit from the mid point terminal O of the local battery through its lower winding, back contact $e$ of relay OT and front contact $e$ of relay OM to the negative terminal C. Relay OT becomes energized over contact $d$ of relay OM and is then controlled over wires 60, 61 and 62 in a manner hereinafter explained to generate the code. Each time relay OT picks up, it opens the line circuit at its contacts $b$ and $d$ to release the line relays R at the stations and connects line wire Y to wire Z through a resistor W5 to discharge the line charging current as is desirable when the line is in a cable. At the same time, relay OT operates relay OR to reverse over the circuit extending from the positive terminal B over front contact $e$ of relay OT through relay OR to terminal O. Each time relay OT releases it closes the line circuit to pick up the line relays R and at the same time it operates relay OR to normal by completing the circuit at its back contact $e$ extending from terminal O through relay OR to terminal C. Relay OR thus operates in unison with the relays R during the transmission of control codes.

Each line relay controls a chain of counting relays over circuits generally similar to those of Patent No. 2,229,249. Thus relay OR, by means of its contact $a$, controls the counting relays O1 to O8 and O16 of Fig. 1B, and each relay R controls a similar chain such as the relays 1 to 8 and 16 of Fig. 2B. Referring to Figs. 2A and 2B, it will be seen that a pick-up circuit for relay 1 is closed momentarily in response to the first of a series of operations of relay R, which extends from terminal B at the right-hand contact $a$ of relay R over back contact $e$ of relay 16, back contact $b$ of relay LBP, front contact $g$ of relay L1, wire 181 through relay 1 to terminal C. Relay 1 therefore picks up on the first step of a code upon the energization of relay L1, and when relay LBP picks up, it opens the circuit just traced and closes a stick circuit for relay 1 extending over front contact $b$ of relay LBP, wire 119, back contact $b$ of relay 2, front contact $a$ and winding of relay 1 to terminal C. When relay R is operated to normal to begin the second step of a code, terminal B is disconnected from relay 1, which remains picked up due to the discharge path provided by the rectifier connected to wire 119, and a circuit is closed from the left-hand contact $a$ of relay R over front contact $d$ of relay LBP, wire 120, back contact $a$ of relay 8, front contact $b$ of relay 1 through relay 2 to terminal C. Relay 2 therefore picks up and completes its stick circuit extending to terminal B at wire 120 over its front contact $a$ and back contact $b$ of relay 3. The operation of contact $b$ of relay 2 disconnects relay 1 from the rectifier but closes a second discharge path for relay 1 comprising the winding of relay 3, whereby relay 1 releases shortly after relay 2 picks up but without sparking at its contact $a$, the dropping of which connects relay 3 to wire 119 to condition that relay to respond to the third step of the code. Relays 4 to 8 are similarly controlled one at a time by current supplied alternately over wires 119 and 120 in response to the fourth to eighth steps of the code. If the various operations associated with these steps as hereinafter described are properly carried out, a chain repeat relay CR is picked up on the eighth step to prepare a pickup circuit for relay 1 over front contact $b$ of relay 8 so that relay 1 will operate as the next in order after relay 8, relays 1 to 7 being then operated through a second cycle on the ninth to fifteenth steps of the code, relay 16 responding in place of relay 8 on the sixteenth step, during which the apparatus is restored to its normal at rest condition.

From a comparison of these circuits with those of Patent No. 2,229,249, it will be seen that a discharge path is provided for each of the relays 1 to 8 each including the winding of another relay, which paths are effective on each intermediate step of the code, whereas in the patent they are effective on certain steps and not on others. It follows that the circuits as shown herein provide more uniform and accurate operation of the counting relays in receiving a code, and since these relays control the transmitter relay T, the transmitted impulses are made more uniform.

Figure 1B:
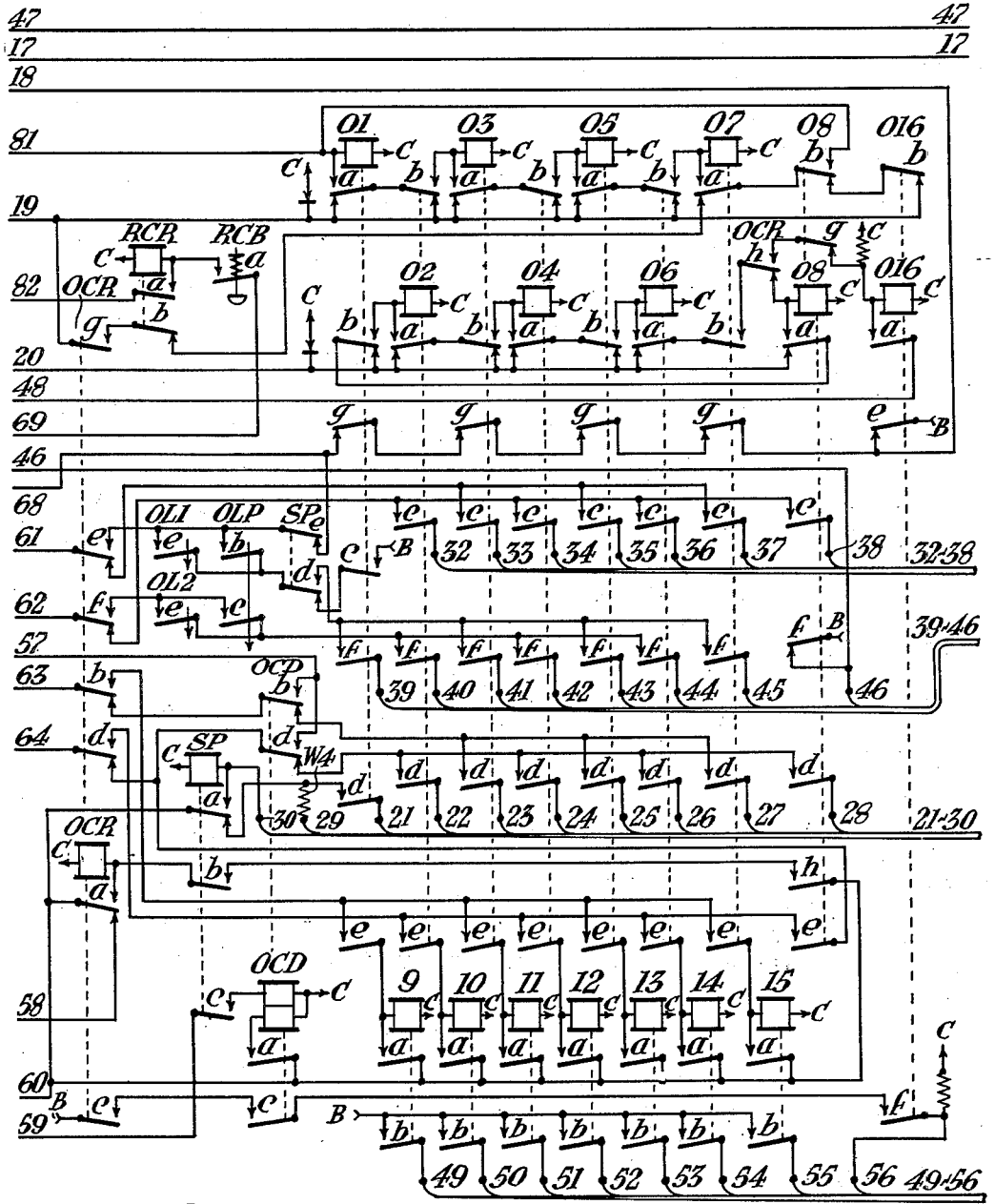
Figure 2B:
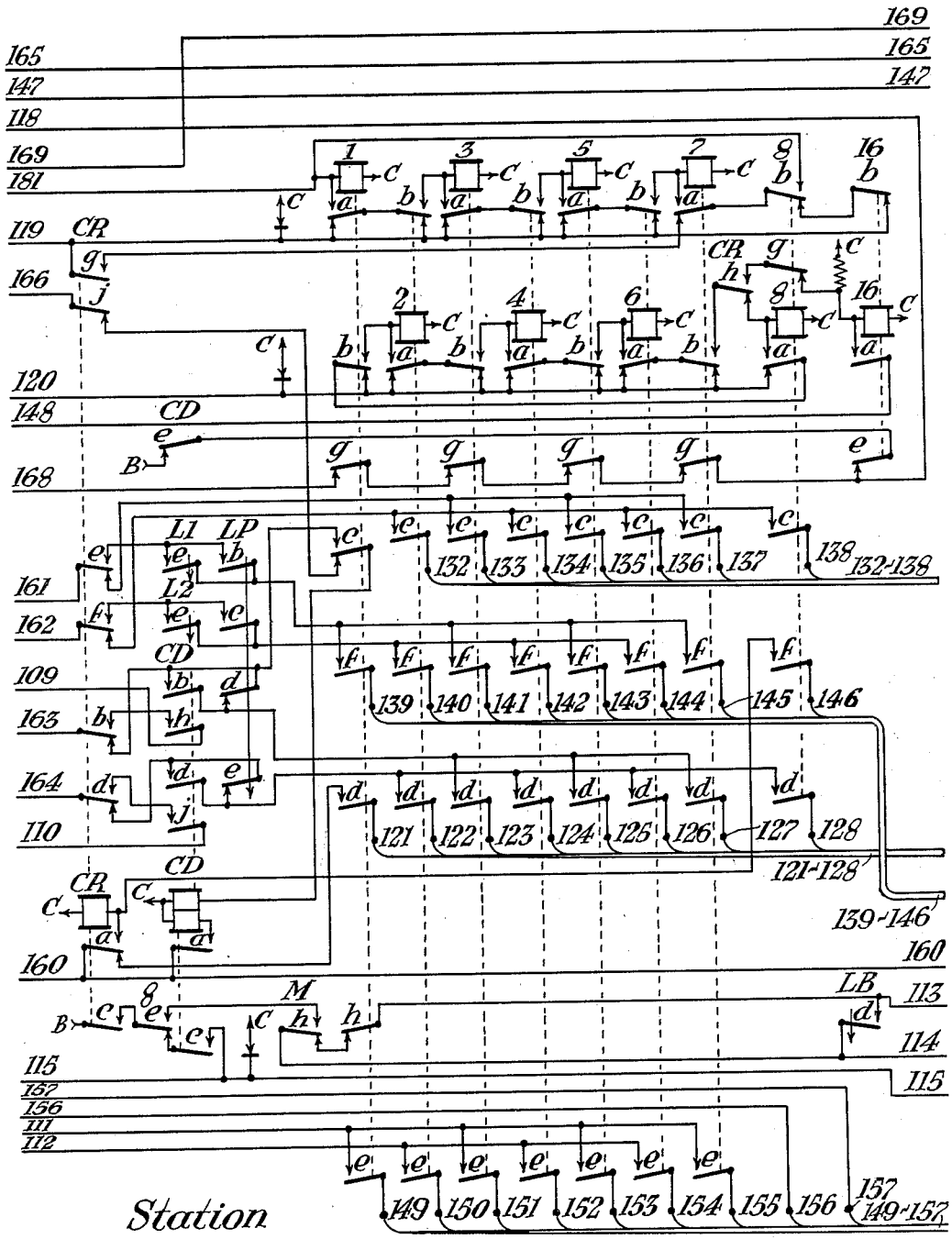

Referring now to Figs. 1A and 1B, it will be seen that the office counting chain circuits are similar to those above described, relay O1 picking up on the first step over wire 81, the remaining relays being operated one at a time by current supplied alternately over wires 19 and 20 in response to the periodic operation of relay OR.

In Patent No. 2,229,249, the timing relays L1 and L2 and the counting relays are energized in parallel over the same contacts of the line relay, in which case the release periods of the timing relays depends to some extent on whether or not a counting relay is connected in parallel therewith to provide a discharge path for a portion of its stored energy. This is a variable condition in the normal operation of the system, as hereinafter pointed out, and the provision of separate contacts $a$ and $b$ for the line relays R and OR renders the operation of the timing relays more uniform and accurate.

Figure 1C:
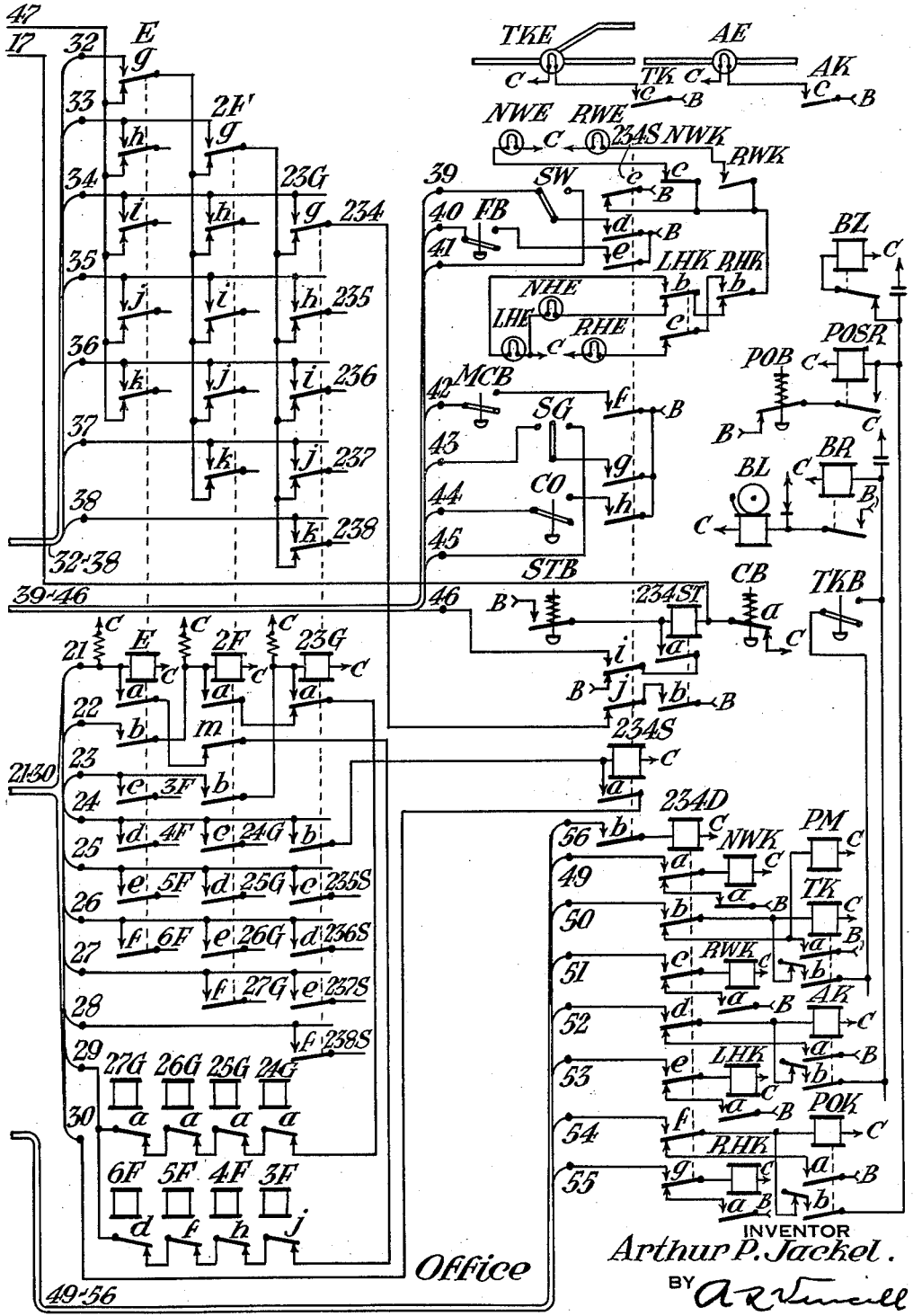

I shall now describe the transmission of a control code, step by step, by the office apparatus of Figs. 1A, 1B and 1C.

To initiate a control code, the operator momentarily presses a starting button STB identifying the control panel associated with the station storage unit to which the code is to be transmitted to thereby pick up a starting relay such as the relay 234ST, which relay is held energized over a stick circuit extending to terminal B at the back contact $i$ of an associated panel selector relay such as the relay 234S until the desired selection has been effected. Wire 47, in Fig. 1C, is normally connected over back contacts of various selecting relays E, F and G to branched circuits extending to contact $b$ of the starting relay ST of each panel. The closing of front contact $b$ of relay 234ST therefore extends the connection of terminal B over a particular branch, which as shown, includes back contact $j$ of relay 234S, and back contacts $g$ of relays 23G, 2F and E to wire 47, and if the system is in its normal at rest condition so that relays OL1 and OL2 are released, a circuit is completed from terminal B at wire 47 over the back contacts $b$ of relays OL1 and OL2 through relay OM to wire 17 and then to terminal C at the normally closed contact of the cancelling button CB. Relay OM therefore picks up in response to the operation of any starting relay such as 234ST and completes a pulsing circuit for the office transmitter relay OT extending from terminal B at back contact $e$ of relay O16 over back contacts $g$ of relays O7, O5, O3 and O1, wire 68, contact $d$ of relay OM through relay OT and resistors W2 and W3 to terminal C. Relay OT therefore picks up to begin the first step of the code, its front contacts $b$ and $d$ opening the line circuit to release the station line relays and its front contact $e$ completing a circuit already traced for operating relay OR to its reverse position, whereupon relay OR operates the timing relays OL and the first counting relay O1 as already described. When relay OLB picks up, its contact $c$ completes a stick circuit for relay OM extending from terminal B at back contact $e$ of relay O16, wire 18, contacts $c$ of relays OLB and OLBP, in parallel, contact $a$ and winding of relay OM, and thence over wire 17 to terminal C.

The first step of each control code is a long step to distinguish it from an indication code in which the first step is relatively short.

When relay O1 picks up on the first step, its back contact $g$ opens the pulsing circuit for relay OT, but relay OT is held energized to generate a long step over a branch circuit extending from terminal B at front contact $c$ of relay O1, back contact $d$ of relay SP, contact $e$ of relay OL1 and contact $b$ of relay OLP in parallel, back contact $e$ of relay SP to wire 68, and thence over contact $d$ of relay OM and the winding and front contact $c$ of relay OT through resistor W3 to terminal C. Relays OL1 and OLP then release successively, the opening of contact $b$ of relay OLP disconnecting terminal B from wire 68 causing relay OT to release to energize the line relays R and to operate relay OR to the left to begin the second step, relay OR causing relay O2 to pick up and relay O1 to release.

The closing of back contact $g$ of relay O1 completes the pulsing circuit for relay OT over wire 68, this circuit functioning repeatedly to generate the short steps of the code. The pick-up time of relay OT depends upon the time constant of the circuit including its winding and resistors W2 and W3. When relay OT picks up, its front contact $c$ short circuits resistor W2 so that the energization of relay OT rises quickly to a higher value than would otherwise be the case, and consequently providing a more constant release period under conditions of variable voltage. Its release period, it will be noted, is determined by the time constant of the circuit including its winding and resistor W3 only, and it follows that its pick-up and release periods may be adjusted independently.

Wires 61 and 62 provide connections, described hereinafter in detail, for holding relay OT picked up or released to generate the long steps of the code. The connection from terminal B to wire 61 is controlled by relays OL1 and OLP so as to hold relay OT picked up after its pulsing circuit opens, to generate a long odd-numbered step, while a similar connection controlled by relays OL2 and OLP extending from terminal B over wire 62 and front contact $f$ of relay OM and back contact $c$ of relay OT to the left-hand terminal of relay OT is effective to short circuit its winding and thereby hold relay OT released after its pulsing circuit closes, to generate a long even-numbered step.

Figure 2C:
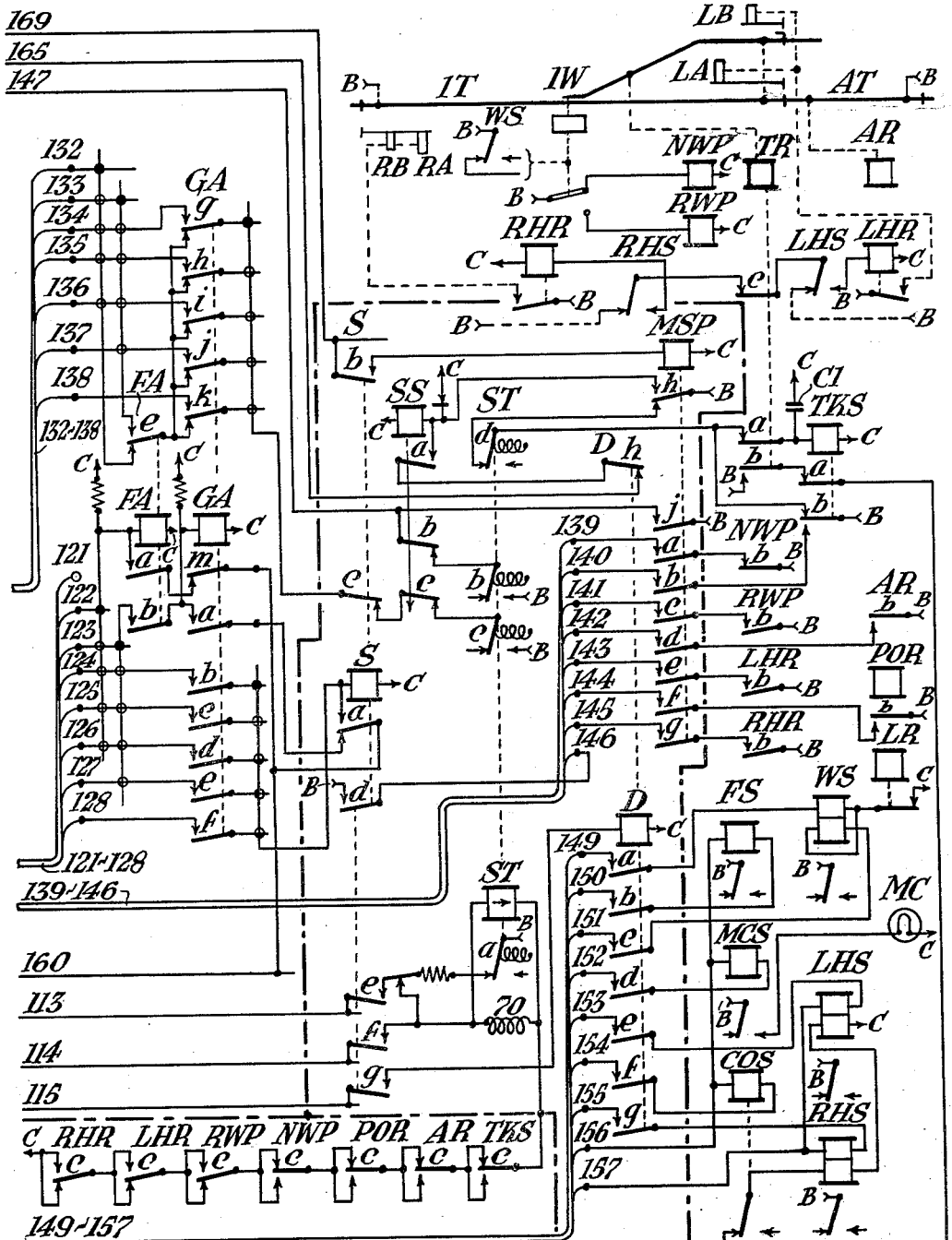
Figure 3:
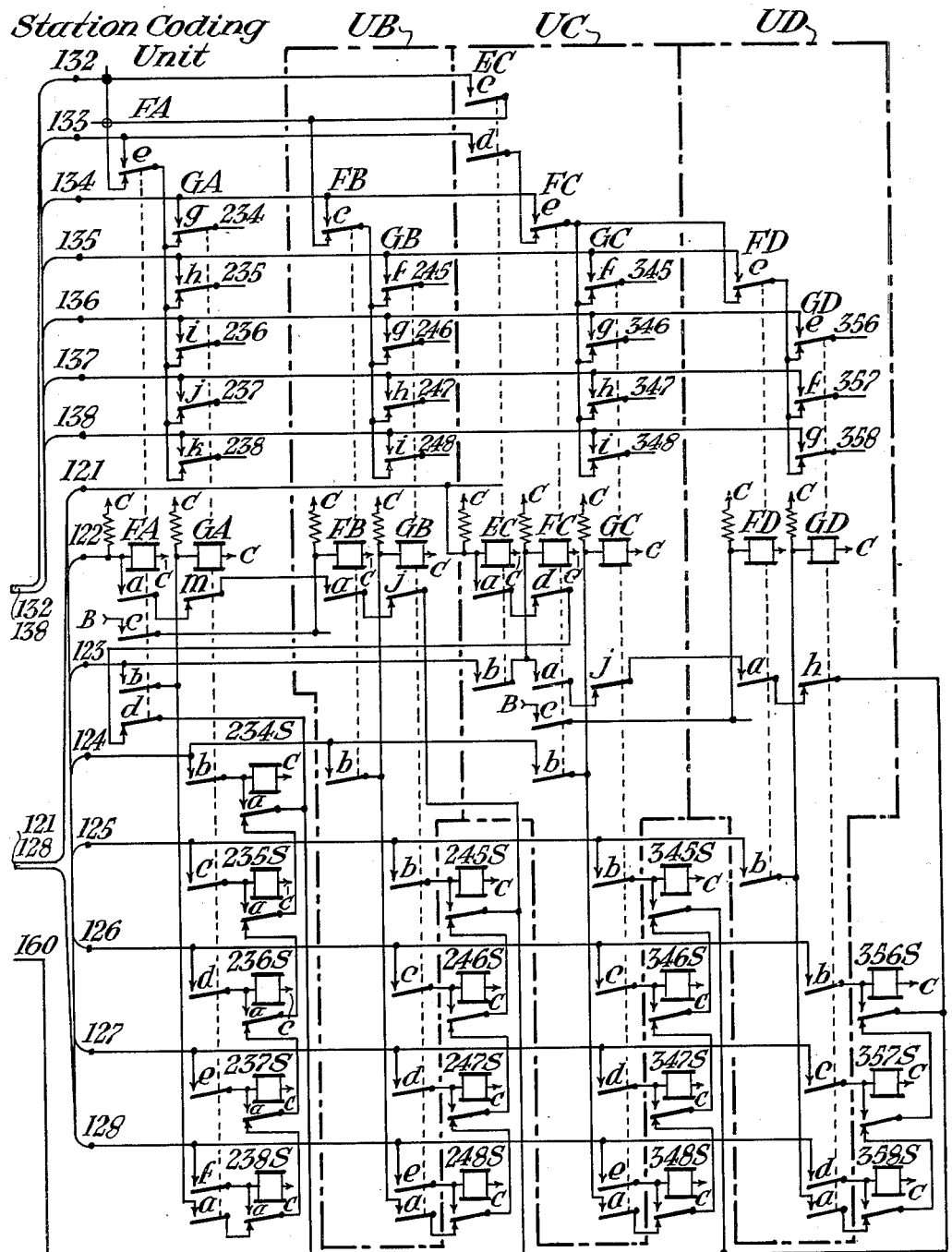
Fig. 3 illustrates the circuits for the pyramid units hereinbefore referred to, and replaces the left-hand portion of Fig. 2C in the circuit plans when connections for additional storage units are required.
Figure 4:
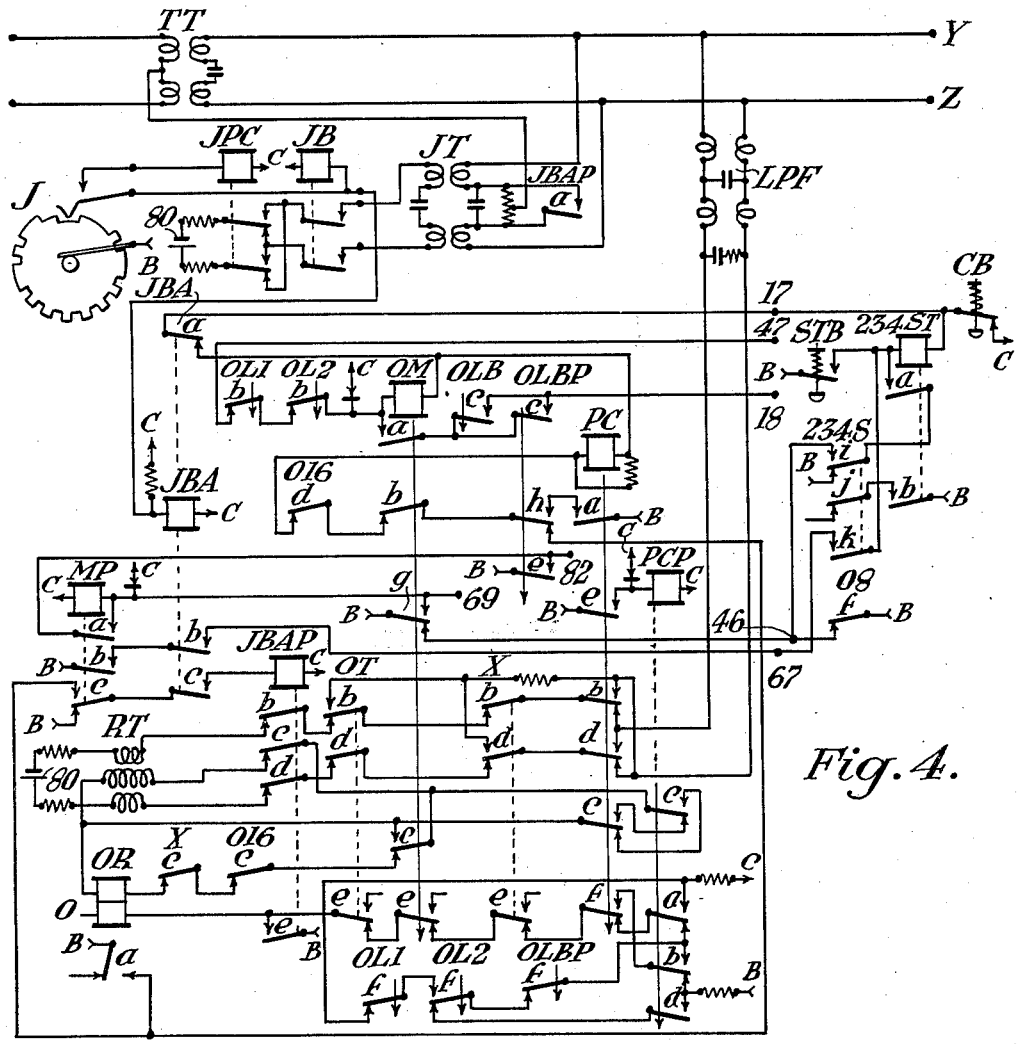
Fig. 4 illustrates a modification of a portion of the office coding unit which replaces the upper part of Fig. 1A in the circuit plans when the system is to use a line circuit over which telephone selectors are controlled, this view also showing a typical code wheel and apparatus for transmitting selector code calls.

The second to eighth steps of each code may be arranged in any one of thirty-five different combinations of three long and four short steps to form station code calls, which are identified by three-digit numbers in which the digits represent the long steps of the code call. Thus the number 234, assigned to the individual panel of Fig. 1C and the corresponding station storage unit of Fig. 2C, is one in which the second, third and fourth steps of the code are long, and the fifth to eighth steps are short. The code calls are generated by completing connections from terminal B at contacts $b$ of the office starting relays ST, to wires 61 and 62, these being arranged so that when a plurality of starting relays are energized, their respective codes will be transmitted one at a time in a given order of code superiority, a long element taking precedence over a short one on each step. That is to say, 234 is the most superior code call, 235 the next, and so on, 678 being the most inferior. The selection of the office panel containing an energized relay ST is effected by the energization of an entry relay E, Fig. 1C, in response to the first element of the code, followed by the energization of three relays in sequence by the three long elements of the code call, comprising a first selector relay F, a group selector relay G, and a station selector relay S, these relays being identified more particularly by prefixes designating the code elements by which their operation is effected. For example, relay 2F is responsive to the second element, relay 23G to the third, provided relay 2F has been operated, and relay 234S to the fourth, provided relay 23G has been operated. When used to capacity the system will employ five F relays, fifteen G relays and 35 S relays, arranged generally as shown in Figs. 2, 3 and 4 of Patent No. 2,229,249 and since the relation of these relays one to another and the connections for associating the different panels with the coding unit may be ascertained from the patent, for simplicity I have shown the circuits herein in condensed form, showing the circuits in detail for only one panel and for only one selecting relay of each kind.

Relay E is picked up on the first step of each code, over a circuit extending from terminal B at contact a of relay OLBP, Fig. 1A, wire 60, back contact a of relay SP, front contact d of relay O1, wire 21, through relay E to terminal C, and relay E then completes a stick circuit at its front contact a extending over back contact m of relay 2F, and over back contacts of relays 3F to 6F, if provided, to wire 29, and thence over resistor W4, back contact a of relay SP and wire 60 to terminal B at contact a of relay OLBP.

It is to be understood that each of the branch circuits extending from terminal B at contact b of a starting relay ST to wire 47 identifies the corresponding code call, as indicated by the references 234 to 238, adjacent contacts g to k of relay 23G. When relay E picks up, these branches are all disconnected from wire 47 and divided into groups by contacts g to k of relay E, and connected to wires 32 to 36 to prepare circuits for generating the first digit of the code call.

When relay O2 picks up on the second step, the connection from terminal B to wire 32 is extended over contact c of relay O2, back contact f of relay OCR to wire 62, and thence to the lefthand terminal of relay OT, thereby short circuiting its winding and holding relay OT released to generate a long second step. Relays OL2 and OLP release, completing a circuit from terminal B at wire 60 over back contact a of relay OCR, wire 58, back contacts d of relays OL2 and OLP, wire 64, back contacts d of relays OCR and OCD, front contact d of relay O2, wire 22, front contact b of relay E through relay 2F to terminal C. Relay 2F picks up, its contact a completing its stick circuit extending over back contacts a of relay 23G and of other G relays of the same group, such as the relays 24G to 27G, if provided, to wire 29, and thence to terminal B over wire 60.

When relay 2F picks up, the branch circuits extending from wire 32 to terminal B over the contacts of those starting relays which have 2 as the first digit of their code calls are disconnected from wire 32 and divided into groups by contacts g to k of relay 2F and connected to wires 33 to 37 to prepare circuits for generating the second digit of the code call. The interruption of the connection to wire 62 by the opening of back contact g of relay 2F allows relay OT to pick up to begin the third step.

Relay E is released by the opening of back contact m of relay 2F, and the opening of front contacts h to k of relay E disconnects the branch circuits for generating code calls in which the first digit is 3, 4, 5 or 6.

Each of the relays E, F and G, and certain other relays hereinafter described, are provided with a discharge circuit including a resistor in lieu of the usual rectifier. These resistors are of a relatively high value in comparison with the resistance of the relay winding, and provide a slight degree of retardation in accordance with the circuit requirements, and also serve to prevent contact sparking.

When relay O3 picks up, the connection from terminal B over wire 33 is extended over contact c of relay O3 and back contact e of relay OCR to wire 61 to complete the stick circuit for relay OT to generate the long third step of the code call 234. Relays OL1 and OLP release, completing a circuit from terminal B at wire 60 over back contact a of relay OCR, wire 58, back contact d of relays OLP and OL1 to wire 63, back contacts b of relays OCR and OCD, front contact d of relay O3, wire 23, front contact b of relay 2F through relay 23G to terminal C. Relay 23G picks up, its contact a completing a stick circuit extending over back contacts a of the associated G relays in series to wire 29, and thence to terminal B at wire 60.

When relay 23G picks up, the branch circuits extending from wire 33 to terminal B over the contacts of those starting relays which have 23 as the first two digits of their code calls are disconnected from wire 33 and divided into branches by contacts g to k of relay 2G and connected to wires 34 to 38 to prepare circuits for generating the third digit of the calls 234 to 238, respectively. The interruption of the connection to wire 63 by the opening of back contact g of relay 23G allows relay OT to release to begin the fourth step.

Relay 2F is released by the opening of back contact a of relay 23G, and the opening of front contacts h to k of relay 2F disconnects the branch circuits which these contacts control, thereby limiting the control of the third digit to those starting relays of the group 234 to 238.

When relay O4 picks up, the connection from terminal B over wire 34 is extended over contact c of relay O4 and back contact f of relay OCR and wire 62 to hold relay OT released to generate the long fourth step of the code call 234. Relays OL2 and OLP release, completing a circuit from terminal B at wire 60 over back contact a of relay OCR, wire 58, back contacts d of relays OLP and OL2, wire 64, back contacts d of relays OCR and OCD, front contact d of relay O4, wire 24, contact b of relay 23G through relay 234S to terminal C. Relay 234S picks up and the closing of its front contact a extends the connection from terminal B at its left-hand terminal, to wire 30 and thence through relay SP to terminal C, so that relay SP picks up, completing its stick circuit extending from terminal B over wire 60 and its front contact a and winding to terminal C, and also completing a stick circuit for relay 234S extending from terminal B at the front contact a of relay SP, wire 30 and the front contact a and winding of relay 234S to terminal C.

The interruption of the connection to wire 62 by the opening of back contact j of relay 234S allows relay OT to pick up to begin the fourth step.

It will be seen, therefore, that whereas at the end of the first long step, relay OT is operated by opening a front contact of relay LP, in the case of the long steps of the station code call relay OT is operated by the opening of back contacts of the selecting relays 2F, 23G and 234S, respectively, each of which relays picks up in response to the closing of a back contact of relay LP. It follows that the long steps of the station code call are all of the same length, but these are slightly longer than the other long steps of the code, which are terminated in the same manner as the long first step.

When relay SP picks up, the opening of its back contact $a$ disconnects terminal B from wire 29, thereby releasing relay 23G. The opening of the front contacts $b$ to $f$ of relay 23G opens the pick-up circuits for relay 234S and other similar relays 235S to 238S, not shown, of the same group, while the opening of front contacts $h$ to $k$ of relay 23G prevents the generation of long code elements on the fifth to eighth steps, when contacts $e$ of the counting relays O5 to O8 leading to wires 35 to 38 are successively closed.

The fifth to eighth steps are therefore short, and when relay O8 picks up a circuit is completed from terminal B over wire 60, contact $h$ of relay O8, contact $b$ of relay SP, through relay OCR to terminal C. Relay OCR therefore picks up on the eighth step completing a stick circuit at its front contact $a$. The opening of back contact $a$ of relay OCR disconnects terminal B from wire 58 and hence from wires 63 and 64, and the closing of front contact $g$ of relay OCR prepares a circuit extending from wire 19 over back contact $b$ of relay RCR, back contact $a$ of relay O7 and front contact $b$ of relay O8 through relay O1 to terminal C, to allow relay O1 to be operated as the next in order after relay O8.

Steps 9 to 15 of the code have now been rendered available for the control of seven movable devices at the selected stations, in accordance with the positions of the control levers or push buttons of the corresponding panel, such as the one shown in Fig. 1C. When relay 234S picks up, terminal B becomes connected over its contacts $d$ to $h$ to the lever contacts and thence to the wires 39 to 45 leading to contacts $f$ of relays O1 to O7. With relay OCR picked up, the $f$ contacts of the odd-numbered counting relays provide connections over front contact $d$ of relay SP, front contacts $e$ and $b$ of relays OL1 and OLP in parallel, front contact $e$ of relay OCR to wire 61 and thence to the stick circuit for relay OT, whereby relay OT may be held energized until relays OL1 and OLP release, to thereby generate long odd-numbered code elements. The $f$ contacts of the even-numbered counting relays provide connections over front contacts $c$ of relays OL2 and OLP in parallel, and front contact $f$ of relay OCR to wire 62, and thence to the left-hand terminal of relay OT, whereby relay OT may be held released until relays OL2 and OLP release, to thereby generate long even-numbered code elements, these circuits obviously being available only during the second cycle of operation of the counting relays. In view of the similarity of these control circuits to those of Patent No. 2,229,249, a detailed description in the present application is believed to be unnecessary.

When the selector relay 234S picks up as above described, its contact $i$ transfers the direct connection of terminal B to the stick circuit for the starting relay 234ST to one including wire 46 and extending to terminal B at back contact $f$ of relay O8, and it follows that the operated starting relay such as 234ST is released on the eighth step of the corresponding code. This has the advantage that it permits the starting relay of any panel to be reenergized by a momentary operation of the associated starting button STB to store a second code for transmission, even though the button is operated before the first code is completed.

During the reception of an indication code, relay O8 and the relay S of the selected panel are also energized as in the case of the control code described, but then receiving relay OM is not energized and its back contact $g$ provides a connection from terminal B to wire 46 to prevent the release of the starting relay, such as relay 234ST, in response to the operation of relay O8.

When relay O16 picks up on the sixteenth step, which, being due to the release of relay OT, is a line closed step, terminal B is disconnected from wires 68 and 18 at back contact $e$ of relay O16 slightly before relay O7 releases to close its back contact $g$. Consequently relay OT remains released, relay OR remains normal, and relay OM releases, and then the timing relays OL2, OLP, OLB, OLBP and OL1 release in that order. Relay O16, which is held energized over a stick circuit including wire 48 and contact $b$ of relay OLB becomes deenergized upon the release of relay OLB and releases. Relay OLBP disconnects terminal B from wire 60, thereby releasing relays CR, SP and the operated selector relay such as 234S, whereupon the apparatus is in condition to receive a new code. If any other office starting relay has been picked up to store a control code, such code will be initiated upon the release of relay OL1, this relay being the last to release. The sixteenth step thus corresponds to the return of the line circuit to its normal closed condition, and in case of the transmission of successive codes, represents a line closed step which is materially longer than any such step occurring within a code.

Considering now the operation of the station apparatus of Figs. 2A, 2B and 2C in receiving a control code as just described, it will be understood that the line relay R at each station and the timing relays L1, L2, LP, LB and LBP operate in unison with the corresponding office relays. The counting relays at each station operate through the first eight steps in unison with the office counting relays, while only those at the selected station at which the selector relay S is picked up, are operated through their second cycle. On the first step of the control code a delivery control relay CD is selectively operated in response to the release of relay L1, due to the long character of this step, over a circuit extending from terminal B at front contact $a$ of relay LBP, wire 160, back contact $d$ of relay L1, wire 163, back contact $b$ of relay CR, contact $c$ of relay 1, through the upper winding of relay CD to terminal C. Relay CD picks up and completes a stick circuit from terminal B at wire 160 over its contact $a$ and lower winding to terminal C.

As shown in Fig. 2C, the station coding unit contains a set of three selector relays FA, GA and S, which may be adjustably connected to respond to any one of the thirty-five code calls, the connections as shown being arranged so that relay S is responsive to the code call 234. The circuits for these relays are generally similar to those for the office selecting relays already described. The circuits for the selector relays which respond on even-numbered steps extend from terminal B at front contact $a$ of relay LBP, Fig. 2A, over wire 160, back contact $d$ of relay L2, wire 164, back contact $d$ of relay CR, front contact $d$ of relay CD and thence over front contacts $d$ of relays 2, 4, 6 and 8 to wires 122, 124, 126 and 128. As shown, a connection to wire 122 provides a circuit for energizing relay FA on the second step, relay FA having a stick circuit extending to terminal B at wire 160 over its own front contact *a* and a back contact *m* of relay GA. The circuits for the selector relays which respond on odd-numbered steps extend from terminal B at wire 160 over back contact *d* of relay L1, wire 163, back contact *b* of relay CR, front contact *b* of relay CD, and thence over front contacts *d* of relays 3, 5 and 7 to wires 123, 125 and 127. As shown, a connection to wire 123 provides a circuit over contact *b* of relay FA for energizing relay GA, the stick circuit for which extends to terminal B at wire 160 over its own front contact *a*, and back contact *a* of relay S. Similarly, a connection to wire 124 provides a circuit over contact *b* of relay GA for energizing relay S, the stick circuit for which is connected directly to terminal B at wire 160 over its own front contact *a*.

It is to be noted that the various selecting relays F, G and S are operated directly following the release of relay L1 or L2 when the apparatus is in the receiving condition as described, and consequently these relays are operated prior to the termination of the long steps, thereby providing a margin to allow for variations in timing.

It is to be understood that the relays FA at the different locations may be connected to any of the wires 122 to 126, and the relays GA to any of the wires 123 to 127 below the one to which the associated relay FA is connected. It follows that when the code call is 234, those relays FA connected to wire 122 will respond to the second long step, those relays FA and GA connected to wire 123 will respond to the third long step and those relays FA and GA connected to wire 124 will respond to the fourth long step along with relay S of the selected station storage unit, but that the selection will be completed to pick up a relay S at one location only. At the other locations the counting relay operations terminate with the eighth step and only the line relay R and the timing relays continue in operation through the remainder of the code.

At the selected station, relay S prepares a pick-up circuit for relay CR completed on the eighth step. This circuit extends from terminal B at contact *d* of relay S, Fig. 2C, wire 146, contact *f* of relay 8, relay CR to terminal C, and when relay CR picks up, its front contact *a* completes its stick circuit extending to terminal B over wire 160. Front contact *g* of relay CR completes a connection from wire 119 over back contact *a* of relay 7 and front contact *b* of relay 8 for effecting the operation of relay 1 next in order after relay 8, and front contact *h* of relay CR completes a connection over back contact *g* of relay 8 for energizing relay 16 in place of relay 8, on the sixteenth step.

The ninth to fifteenth steps of the control code are employed for the control of a series of control relays of the stick polar type, in accordance with the positions of the corresponding office levers. Fig. 2C shows a typical arrangement of such relays including a switch control relay WS and signal control relays LHS, RHS and COS, which may be used to control a track switch and an associated group of signals in the manner described in connection with Figs. 8 and 9 of Patent No. 2,229,249. In the present system, however, the control code includes two additional steps providing for the control of two additional stick relays, such as the relays FS and MCS shown.

These polar stick relays are operated to normal or reverse by impulses supplied by the coding unit over wires 149 to 155, inclusive, and are placed under the control of the station coding unit by the operation of a delivery relay D. Relay D at the selected station is picked up when relay 8 releases on the ninth step of a control code, over a circuit extending from terminal B at contact *c* of relay CR, Fig. 2B, back contact *e* of relay 8, front contact *c* of relay CD, wire 115, front contact *g* of relay S through relay D to terminal C, and remains energized until the end of the code.

Circuits suitable for operating the polar stick control relays in accordance with the long or short character of the ninth to fifteenth steps of the code are obtained by the operation of a pair of register relays P1 and P2, Fig. 2A, the circuits for which are prepared by the closing of front contacts of relays CR and CD. If relay L1 releases on any odd-numbered step of the group comprising steps 9 to 15, a circuit is closed from terminal B at contact *a* of relay LBP, wire 160, back contact *d* of relay L1, wire 163, front contact *b* of relay CR, front contact *h* of relay CD, wire 109, and the upper winding of relay P1 to terminal C. When relay P1 picks up, it is held energized for the duration of the next following even-numbered step over a stick circuit extending from terminal B at the left-hand contact *a* of relay R, front contact *d* of relay LBP and the front contact *a* and lower winding of relay P1 to terminal C, relay P1 releasing when the left-hand contact *a* of relay R is opened at the beginning of the next odd-numbered step. Similarly, if relay L2 releases on any one of the even-numbered steps 10, 12 or 14, relay P2 is energized over the circuit from terminal B at wire 160, back contact *d* of relay L2, wire 164, front contact *d* of relay CR, contact *j* of relay CD, wire 110 and the upper winding of relay P2 to terminal C. When relay P2 picks up, it is held energized for the duration of the next odd-numbered step, during which relay R is reversed, over a stick circuit extending from terminal B at the right-hand contact *a* of relay R, back contact *e* of relay 16, front contact *b* of relay LBP and the front contact and lower winding of relay P2 to terminal C, relay P2 releasing when the right-hand contact *a* of relay R is opened at the beginning of the next odd-numbered step.

The circuits which the contacts of relays P1 and P2 provide for the control of the polar stick relays are of a variety of types, one of which is illustrated by the circuits for relay WS, which relay is controlled in accordance with the position of the switch lever SW of Fig. 1C. When lever SW is normal, the ninth step of the control code is long and the eleventh step short, and when lever SW is reversed, the ninth step is short and the eleventh step long. If lever SW is normal, relay P1 is picked up on the ninth step, and when relay R is operated to the left to begin the tenth step, its contact *a* connects terminal B to the stick circuit for relay P1 to hold it picked up, and also connects terminal B to front contact *b* of relay P1 to complete a circuit momentarily over wire 111, contact *e* of relay 1, wire 149, contact *a* of relay D through the upper winding of relay WS and the front contact of relay LR to terminal C, thereby operating the contacts of relay WS to their left-hand position as shown. Relay WS is thus energized in the normal direction in multiple with relay 2, by an impulse which is terminated upon the release of relay 1. Relay P1 is not operated on the eleventh step, and although, at the beginning of the twelfth step, wire 111 is connected momentarily over contact e of relay 3, wire 151, contact c of relay D and the lower winding of relay WS to terminal C, relay WS is not energized because relay P1 is in its released position in which wire 111 is disconnected from terminal B. Similarly, if lever SW is reversed, so that the ninth step is short, relay P1 remains released and relay WS is not operated on the tenth step, and when the long eleventh step is reached relay P1 picks up so that relay WS receives an impulse through its lower winding to operate it to reverse on the twelfth step.

Another type of control circuit is illustrated by the one for relay FS, which is controlled by the office key FB so as to be operated to normal or reverse in accordance with the short or long character of a single code step. If the tenth step is short, relay P2 is in its released position when relay R is operated to the right to begin the eleventh step, and a circuit is then closed momentarily from terminal B at the right-hand contact a of relay R over back contact e of relay 16, front contact b of relay LBP, back contact b of relay P2, wire 156 through relay FS to contact b of relay D, wire 150, contact e of relay 2, wire 112, back contact c of relay P2, to terminal C so that relay FS is operated to the left. If the tenth step is long, relay P2 is picked up and held energized by relay R for the duration of the eleventh step and its contacts b and c reverse the direction of the flow of current through relay FS, and it will be operated to the right. The circuits for relays MSC and COS are similarly controlled by relay P2, and relays LHS and RHS by relay P1, each by a momentary impulse at the beginning of the step following its assigned step, that is to say, following the step the character of which governs its operation. Relays LHS and RHS are also provided with a local restoring circuit which functions in a manner hereinafter described to energize these relays in the normal direction in response to the release of the track relay TR.

In the foregoing two types of circuits for controlling polar stick relays are described. In the first type, as illustrated by the circuit for relay WS, the polar stick relay is energized only if the corresponding register relay P1 or P2 is picked up in response to a long step, and is non-responsive if the step is short. In the second type, as illustrated by the circuit for relay FS, the polar stick relay is energized in one direction if the assigned step is long and in the opposite direction if that step is short. A third type, not shown, is also available, and may be obtained by connecting any of the relays to wire 158 or 159, leading to back contact a of relay P2 or P1, Fig. 2A, instead of to wire 156 or 157. Assuming that one terminal of relay FS is connected to wire 158 instead of to wire 156, for example, its other terminal being connected to wire 112 as shown, it will be seen that relay FS will be momentarily energized by relay R only when the assigned step is short so that relay P2 remains released. It follows that any of the polar stick relays may be arranged to respond to a short step but to be non-responsive when the step is long.

When the sixteenth step of the control code is reached, the line relays R remain steadily energized and the timing relays L at each station release in unison with the corresponding office relays and likewise the relays 7, 16, CR and S at the selected station, relay L1 being the last to release. Relay CD is released by relay LBP along with relay CR and then relay D is released, placing the apparatus in condition to receive a new code. The release of relay L1 places the apparatus in condition to initiate the transmission of an indication code, assuming that the relay SS, hereinafter described, is not energized.

The station coding apparatus of Figs. 2A, 2B and 2C is also adapted to transmit indication codes which the office apparatus is adapted to receive. Each indication code comprises sixteen steps, of which the first is relatively short, the second to eighth are arranged in different combinations of three long and four short steps to operate selecting relays F, G and S at the office and station in accordance with different code calls as already described, and in which the ninth to fifteenth steps may be made long or short to indicate the condition of seven movable devices at the station by the operation of a group of indication relays K of the selected office panel, on the sixteenth step of the code.

A typical group of such devices is shown in Fig. 2C, illustrated as a group of indicating relays including a track storing relay TKS, an approach relay AR, a power-off relay POR, normal and reverse switch repeating relays NWP and RWP, and two signal control relays LHR and RHR. The station apparatus is arranged to initiate an indication code automatically in response to a change in position of any of the indicating relays, each such code being stored for transmission when the line circuit becomes available, by the release of the station starting relay ST of Fig. 2C. Relay ST is normally held energized over a stick circuit extending from terminal B at its own front contact a, over back contact e of relay S, the winding of relay ST and thence over a front or back contact c of each of the several indicating relays, in series, to terminal C. An indication code may also be initiated manually by the transmission of a special "recall" code from the office, by means of which relay ST may also be released, as explained hereinafter. Heretofore a normally energized starting circuit of this type has been objected to because of the necessity for a special adjustment of the contacts of the indicating relays in order to insure the release of the starting relay during the brief period the circuit is opened during the transit of the contact from one position to another. This difficulty has been overcome in the circuits as shown by the use of a sensitive relay of the biased polar type having an inductance 70 connected across its terminals. The energy stored in coil 70 when relay ST is energized provides a source of induced current for operating relay ST to its reverse position to open its stick circuit in response to any sudden increase in circuit resistance due to the movement of one of the indicating relay contacts c, even though the time such contact is actually open is substantially zero, consequently no special adjustment of these contacts is needed.

I shall next describe the transmission of an indication code by the apparatus of Figs. 2A, 2B and 2C, assuming the code to be initiated as the result of a train movement through the track section IT. The opening of contact a of the track relay TR opens the normally closed stick circuit for relay TKS extending to terminal B at its front contact b, and also opens its pick-up circuit extending from terminal B at back contact h of relay MSP, left-hand contact d of relay ST and front contact a of relay TR through relay TKS to terminal C, and relay TKS releases, its contact c in turn opening the stick circuit for relay ST causing it to release.

If the line circuit is available, the starting circuit is closed, extending from terminal B over back contacts b of relays ST and SS, wire 147, contact b of relay RP, contact a of a cut-out relay COR, back contacts b of relays L1 and L2 through relay M to terminal C. Relay M picks up, completing a temporary stick circuit over its contact a extending to terminal B at wire 147 over back contact c of relay LBP. Contacts b and d of relay M reverse the connections of relay R to line wires Y and Z, front contact d of relay M also closing a low impedance shunt path from line Y over back contacts f of relays CD and LPB to line Z. Contacts c and d of relay M now connect the condensers of the low pass filter LPF across the line, so that during transmission, its connections correspond to those of the one at the office. Normally, the impedance across the line presented by the station apparatus is materially increased, as is desirable, by disconnecting those condensers, this arrangement being shown in a copending application for Letters Patent of the United States Serial No. 401,092, filed July 5, 1941, by G. W. Baughman and N. F. Agnew, for Remote control systems.

When the line circuit is shunted by relay M, the associated line relay R releases and the increase in current delivered by battery 80 causes transformer RT, Fig. 1A, to deliver an impulse operating relay OR to reverse substantially in unison with relay R.

Relay R operates the associated timing relays and relay 1, the closing of contact c of relay LB completing the normal stick circuit for relay M extending over wire 118 and back contacts e of relays 16 and CD to terminal B.

Relay OR operates the timing relays OL, relay 1 and relay E, as on the first step of a control code, and in addition a circuit is completed from terminal B at the right-hand contact a of relay OR over back contact h of relay OLBP, back contact b of relay OM, back contact d of relay O16 through relay PC to wire 17 and thence to terminal C at contact a of button CB. Relay PC therefore picks up and its contacts b and d reverse the polarity of the current delivered to the line, while its contact c completes a circuit energizing a slow pick-up, slow release repeating relay PCP.

The sudden variation in the line current due to the operation of relay PC is devoid of effect upon relay OR for the reason that when relay PC picks up, the secondary of transformer RT is momentarily short circuited over the front contact c of relay PC and back contact c of relay PCP, and the lower winding of relay OR is energized in the reverse direction over the circuit extending from terminal B at back contact b of relay PCP, front contact f of relay PC, and back contacts e of relays X, OM and OT through relay DR to terminal O. Relay PC is held energized over a stick circuit including its front contact a and front contact h of relay OLBP until relay O16 picks up upon the return of relay OR to normal at the end of the code.

The shunt across line wires Y and Z applied by relay M at the transmitting station as described will also short circuit and consequently release the line relays R at stations more remote from the office. If the transmitting station is at a considerable distance from the office it may be that the voltage across the line, which varies from nearly the full voltage of battery 80 at the office to substantially zero at the point where the shunt is applied, will remain sufficient to keep the relays R picked up at stations near the office. These relays, however, will be released by the reversal of line polarity by relay PC. It follows that all line relays R release substantially in unison when any relay M picks up to initiate a code, each relay R operating its timing relays L and first counting relay 1.

At each station at which relay M is not operated, relay R remains released, holding relay L2 energized but allowing relay L1 to release to pick up relay CD, and then relays LP, LB, LBP, 1 and CD release in that order.

At the transmitting station, the closing of front contact e of relay M completes the pulsing circuit for relay T, which extends from terminal B at back contact e of relay CD, Fig. 2B, over back contact e of relay 16 and back contacts g of relays 7, 5, 3 and 1, wire 168, contact e of relay M through relay T and resistors W6 and W7 to terminal C. Relay T transmits the code by the operation of its contact b which is rendered effective when relay LBP picks up on the first step to open its back contact f in parallel therewith. Each time relay T picks up, a low resistance shunt path is closed from line Y over back contact f of relay CD, front contact b of relay T and front contact d of relay M to line Z, and at the same time, the circuit for relay R which now extends from the positive wire Z over front contact d of relay M, back contact b of relay T, resistor W1, relay R, front contact b of relay M to wire Y, is opened by relay T, thereby releasing relay R more quickly than if it was merely short circuited by the closing of front contact b of relay T.

Although the first step of an indication code is short in comparison with the first step of a control code, it is slightly longer than the other short steps, since it begins before relay T picks up, and because relay T is held energized until relay LB picks up, which occurs shortly after relay 1 picks up to open the pulsing circuit, due to the provision of a connection from terminal B at back contact e of relay LBP over back contact d of relay LB to wire 168.

The response of the apparatus at the transmitting station as required to allow the transmission to continue is also dependent upon conditions at the office. Since the connections of relay R to the line have been reversed by relay M, relay R picks up to begin the second step only if relay PC has been picked up to reverse the polarity of the line current, this indicating that the office apparatus is in the proper receiving condition with relay OM released.

The code call steps of the indication code are generated by relay T in the same manner as by relay OT in the control code already described. Assuming this to be 234, the second step is prolonged by the closing of a hold-down circuit for relay T extending from terminal B over back contacts c of relays ST, SS and S, back contact g of relay GA, back contact e of relay FA to wire 132, thence over contact c of relay 2 and back contact f of relay CR, wire 162, contact f of relay M, and back contact c of relay T to its left-hand terminal, thereby short circuiting relay T. On the second step, relay FA picks up in response to the release of relays L2 and LP and its contact e transfers the connection of terminal B from wire 132 to wire 133, opening the hold-down circuit for relay T to allow it to pick up to begin the third step. The third step is prolonged by the operation of the stick circuit for relay T extending from terminal B over front contact e of relay FA to wire 133, thence over contact c of relay 3, back contact e of relay CR, wire 161, contact a of relay T and the winding and front contact c of relay T and resistor W7 to terminal C. On the third step, relay GA picks up in response to the release of relays L1 and LP and its contact g transfers the connection of terminal B from wire 133 to wire 134, opening the stick circuit for relay T to allow it to release to begin the fourth step, which like the second, is prolonged by the operation of a hold-down circuit for relay T, the circuit for generating the long fourth step including front contact g of relay GA, wire 134 and contact c of relay 4. On the fourth step, the station selector relay S picks up in response to the release of relays L2 and LP, the opening of back contact c of relay S allowing relay T to release to begin the fifth step.

When relay S picks up it completes the circuit for the repeating relay MSP, extending from terminal B at front contact g of relay M, Fig. 2A, over wire 169, contact b of relay S through relay MSP to terminal C. Relay MSP therefore picks up on the step corresponding to the last digit of the code call, remaining energized until the end of the code.

Since the pulsing circuit for relay T functions in the same manner as that for relay OT already described, it will be clear that if relay S is operated on the fourth step, the fifth to eighth steps will be short steps, generated by the operation of relay T over its pulsing circuit. Relay CR picks up on the eighth step over the circuit extending from terminal B at contact d of relay S, wire 146, contact f of relay 8 through relay CR, to terminal C, relay CR completing its stick circuit extending to terminal B at wire 160 by closing its front contact a.

When relay CR picks up, it completes a pick-up circuit for the normally energized starting relay ST extending from terminal B at contact c of relay CR over front contact e of relay 8, front contact h of relay M, wire 114, front contact f of relay S through relay ST and coil 70, in parallel, and thence over the front or back contacts c of the indicating relays TKS, etc., to terminal C. Relay ST picks up and establishes a temporary stick circuit extending from terminal B at its front contact a over front contact e of relay S, wire 113, front contact d of relay LB, to wire 114, and thence as traced above through relay ST and coil 70 to terminal C.

On the eighth step, relay CR establishes connections from terminal B at the contacts b of the indicating relays NWP, TKS, etc. of Fig. 2C over contacts a to g of relay MSP, wires 139 to 146, completed successively over contacts f of relays 1 to 7 on the ninth to fifteenth steps of the code, either over contact e of relay L1 and contact b of relay LP, in parallel, and front contact e of relay CR to wire 161, or over contact e of relay L2 and contact c of relay LP, in parallel, and front contact f of relay CR to wire 162, to hold relay T up or down, as the case may be, until relay LP releases, thereby rendering these steps available for indicating the positions of seven indicating relays at the same location.

When the sixteenth step is reached, relay R at the transmitting station picks up, energizing relay 16 which opens its back contact e to disconnect terminal B from wires 168 and 118. Relay T remains released and relay M releases, reversing the connections for relay R to render it responsive only to line current of normal polarity. At the office, relay OR is operated to normal, energizing relay O16, which relay by opening its back contact d releases relay PC, thereby restoring the line polarity to normal so that relay R will remain steadily energized after relay M releases. Relay PC releases relay PCP, and relay OR releases relays OL2, OLP, OLB, OLBP and OL1, in order.

Relay OR remains in its normal position and is not affected by the operation of relay PC because when this occurs transformer RT is short circuited over back contact c of relay PC and front contact c of relay PCP, and relay OR is held energized in the normal direction until relay PCP releases over the circuit extending from terminal O through the lower winding of relay OR, back contacts e of relays OT, OM and X, back contact f of relay PC, and front contact a of relay PCP to terminal C.

The restoration of the line polarity to normal by relay PC causes the line relay R at each of the other stations to pick up. At these stations, relays L1, LP, LB and LBP pick up and then relays L2, LP, LB, LBP and L1 release in that order.

At the transmitting station, even though relay M releases at the exact instant that the line polarity is restored to normal, relay R may be momentarily deenergized, but since relay 16 is picked up, its contacts d and e connect the right-hand and left-hand contacts a and b of relay R together so that the circuits controlled by relay R remain in the same condition as if relay R remained steadily energized. Consequently the timing relays L at that station release in order, substantially in unison with those at the office and slightly in advance of those at the other stations. Relay MSP is released by relay M, relay 16 is released by relay LB and relays CR and S are released by relay LBP. When relay M releases, its back contact h, Fig. 2B, connects wire 113 over back contact h of relay 1 to wire 114 to maintain the temporary stick circuit for relay ST closed after relay LB releases. When relay S releases, the dropping of its continuity transfer contact e restores the normal stick circuit over which relay ST is held energized until a change occurs in the position of one of the indicating relays to initiate a new code.

It will be seen that all coding units are restored to normal and placed in the proper receiving condition prior to the release of relays OL1 and L1 to condition the system for the transmission of the next code.

A change in position of one of the indicating relays may occur during the transmission of the indication code just described. If this occurs prior to the transmission of any of the indicating steps nine to fifteen, relay ST will be reenergized on the eighth step and but one code will be transmitted. Since the pick-up circuit for relay ST is opened at the beginning of the ninth step, the temporary stick circuit by which relay ST is held energized will be opened to cause it to release again if a change in the position of any of the indicating relays occurs subsequent to the transmission of the eighth step. Thus a new indication code will be transmitted to indicate the new condition.

It may also occur, due to a fault, that the transmission is interrupted before the sixteenth step is reached to restore the normal stick circuit for relay ST. If an extended pause in the operation of relay R occurs after relay ST has been picked up, relay L1 or L2 will release, releasing relay LB. In this instance relay LB will open its contact d before relay M releases, to release relay ST and thereby condition the apparatus to retransmit the code in its entirety when the line becomes available.

Heretofore in connection with starting relays of the normally energized type, as illustrated for example by the relay S of the Letters Patent of the United States No. 2,273,231, issued February 17, 1942, to C. S. Snavely et al., it has been necessary to provide a repeating relay SP, which is restored to normal at the end of a complete code, in order to make sure that a code interrupted on any of the steps following the one on which the starting relay is picked up, will be retransmitted. This result is attained in accordance with my invention by the provision of a temporary holding circuit as above described, in addition to the normal holding circuit for the station starting relay ST.

I shall now describe the operation of the office apparatus of Figs. 1A, 1B and 1C in receiving an indication code. It will be understood that relay OR is operated, through transformer RT, to the right on each odd-numbered step and to the left on each even-numbered step, and thus operates its timing and counting relays through sixteen steps in unison with the corresponding relays at the transmitting station.

On the first step, relays OL1, O1, E, PC and PCP pick up as already described, as well as relays OL2, OLP, OLB and OLBP, but relay OL1 does not release because the first step is short. Selected ones of the office relays F, G and S pick up on the steps corresponding to the digits of the station code call. More particularly, in response to the code call 234, relays 2F and 23G are operated on steps two and three, and relays 234S and SP on step four. In the receiving condition, back contact d of relay OLP in the circuits for these relays is bridged by front contact f of relay PCP, so that these relays are picked up upon the closing of back contact d of relay OL1 or OL2, on the long steps.

The energization of relay PCP also prepares a circuit extending from terminal B in Fig. 1A over front contacts c of relays OL1 and OL2, front contact e of relay PCP, wire 59, front contact c of relay SP through the upper winding of relay OCD to terminal C. Since relay SP is picked up over a back contact of relay OL1 or OL2, the circuit for relay OCD is held open on the step on which relays S or SP are operated, and closes as soon as relay OL1 or OL2 picks up at the beginning of the next step following the final digit of the station code call, that is, on the fifth step when the code call is 234. When relay OCD picks up it completes a stick circuit over its contact a and lower winding extending to terminal B at wire 60.

Relay OCR picks up on the eighth step as previously described. Front contact f of relay PCP maintains the connection from terminal B at wire 60 over back contacts d of relays OL1 and OL2 to wires 63 and 64 after relay OCR picks up, and the closing of front contacts b and d of relay OCR prepares circuits extending from wires 63 and 64 to contacts e of relays O1 to O7 whereby a series of register relays 9 to 15 are rendered responsive to the character of the correspondingly numbered steps of the code. That is, when terminal B is connected to any one of the wires 139 to 145, Fig. 2C, over a contact of an indicating relay, the corresponding step of the transmitted code will be prolonged and at the office, the corresponding one of the register relays 9 to 15 will be picked up. If the ninth step is long, for example, relay OL1 will release closing its back contact b to complete a circuit from terminal B at contact a of relay OLBP over contact f of relay PCP, back contact d of relay OL1, wire 63, front contact b of relay OCR, contact e of relay O1 through relay 9 to terminal C, relay 9 picking up to complete a stick circuit extending to terminal B at wire 60 over its front contact a, and also closing its contact b to connect terminal B to wire 49.

On the sixteenth step, relay O16 picks up, closing a circuit from terminal B over front contacts c of relays OCR and OCD, Fig. 1B, contact f of relay O16, wire 56, contact b of the selector relay 234S through the associated delivery relay 234D to terminal C. Relay 234D therefore becomes energized to operate the indication relays K of the group which it controls in accordance with the positions of the register relays 9 to 15. Relay 234D opens the stick circuits for the relays K and prepares pick-up circuits for each of these relays, extending over wires 49 to 55 to terminal B at the front contacts b of relays 9 to 15, respectively, the position of which indicates the condition of the indicating relays of the group controlling the transmission of the code.

The opening of back contact d of relay O16 on the sixteenth step releases relay PC, which in turn releases relay PCP. The release of relay PC restores the line polarity to normal, relay OR being held normal over back contact f of relay PC and front contact a of relay PCP until relay PCP releases, relay OR being disconnected from transformer RT by the opening of back contact c of relay O16. The office timing relays then release in the normal order, relay OL1 being the last to release. Relay OLB releases relay O16, which releases relay 234D, reestablishing the stick circuits for the indication relays K which were energized over wires 49 to 55. Relay OLBP releases relays OCR, OCD, SP and 234S, as well as the energized relays of the group 9 to 15.

In the foregoing, it was assumed that the code was initiated by the release of the track relay TR, relay 10 being energized on the tenth step and relay TK on the sixteenth step to light the lamp TKE, and also, if key TKB is closed to operate the bell relay BR momentarily over contact b of relay TK to actuate the single stroke bell BL. If this code is repeated, relay TK remains picked up and the bell BL is not operated, as will be readily apparent. Front contact a of relay TK provides a connection from terminal B for energizing the pen magnet PM of a graphic recorder such as is usually provided in systems of this character.

In order to insure that magnet PM will be operated in response to each train movement through the controlling track section, even though the line circuit does not become available for the transmission of the indication code until after the track section has been vacated, a storing relay TKS is provided as shown in Fig. 2C, which relay is normally held energized over a stick circuit extending from terminal B at its front contact b over front contact a of relay TR through relay TKS to terminal C. The release of relay TR when a train enters section 1T therefore releases relay TKS to open its stick circuit and to connect terminal B over its back contact b to contact b of relay MSP, to condition the unit to transmit a track occupied indication. Relay ST is released by the dropping of contact c of relay TKS, and opens its contact d in the pick-up circuit for relay TKS extending to terminal B at back contact h of relay MSP, so that relay TKS remains released until the track occupied code is transmitted. During the transmission of this code, back contact h of relay MSP opens prior to the closing of contact d of relay ST, which occurs on the eighth step, and when back contact h of relay MSP closes again on the sixteenth step, relay TKS becomes reenergized, provided relay ST is picked up, indicating that the track occupied code has been transmitted and provided also that relay TR is picked up. When relay TKS picks up, the opening of its back contact c releases relay ST again, to initiate a code for indicating the track clear condition, but since relay ST is extremely fast, the energizing circuit for relay TKS is opened by relay ST before relay TKS is fully picked up to establish its stick circuit. A condenser C1 of relatively large capacity provides sufficient energy storage to prolong the energization of relay TKS until its front contact b closes to establish its stick circuit, under the condition described.

Relay TKS also controls a circuit for restoring the polar stick signal control relays to normal when a train enters the track section to release relay TR, to prevent the clearing of the signals automatically when a train vacates the track section, no additional repeating relay being required, this circuit extending from terminal B at back contact b of relay TR over front contact a of relay TKS through the lower windings of relays LHS and RHS in series, to terminal C.

I shall next describe how the system is restored to normal in the case of a fault.

A control code may be terminated on an odd-numbered step due to a fault, relay OT being held energized over wire 68, for example. Relay OR is then held reversed until the timing relays OL1, OLP, OLB and OLBP release, relay OL2 remaining energized. Relay OLBP releases relay OM and opens the counting and selecting relay circuits. The release of relay OM with relay OR reversed allows relay PC to pick up. Relay OM also releases relay OT, and relay PC picks up relay PCP.

At each station, relay R remains released and the timing relays release in the same order, relay OL2 remaining energized. Relay LBP opens the counting and selecting relay circuits to prevent further reception. The release of relay OT closes the line circuit, but the relays R do not pick up because the polarity has been reversed by relay PC.

When relay PCP picks up, relay OR is operated to normal over the circuit from terminal C through its lower winding and back contacts e of relays OT, OM and X, front contacts f and b of relays PC and PCP, front contact f of relay OL2 and back contacts f of relays OLBP and OL1 to terminal C. The office timing relays are thereby reenergized and relay PC is deenergized, relay PC releasing before relay OLBP picks up. The office timing relays then release in the normal order due to the deenergization of relay OL2, and relay PCP also releases, relay OL1 being the last to release.

When relay PC releases it restores the line polarity to normal so all the line relays R pick up in unison, reenergizing their timing relays, and the timing relays at each station then release in the normal order due to the deenergization of relay L2, relay L1 being the last to release.

If a control code is terminated on an even-numbered step prior to the sixteenth step, due to the failure of relay OT to pick up, relay OR is held normal and the timing relays release in the normal order, relay OLBP releasing the counting and selecting relay circuits and also releasing relay OM, relay OL1 being the last to release. The station line relays remain steadily energized and their timing relays release in the normal order as at the end of a complete code, relay L1 being the last to release.

If an indication code is terminated on an odd-numbered step, as for example, would be the case if relay T remained picked up due to a fault, relay OR remains reversed until relay OLBP releases, relay OL2 remaining picked up. Relay OR is restored to normal upon the closing of back contact f of relay OLBP over the circuit above traced which includes front contacts of relays PC, PCP and OL2, and back contacts f of relays OLBP AND OL1.

At the transmitting station, relay R remains released, and the timing relays L1, LP, LB and LBP release. Relay LB releases relay M, which relay releases relay T and removes the line shunt applied by relay T, and also reverses the connections for relay R so that relay R remains released, the apparatus assuming the same condition as at the other stations where relay R and the timing relays stand released with relay L2 picked up.

When relay OR is restored to normal, the office timing relays are reenergized and relay PC is deenergized and releases before relay OLBP picks up. The office timing relays them release in the normal order, relay OL1 being the last to release.

When relay PC releases, it restores the line polarity to normal so all the line relays R pick up in unison, reenergizing their timing relays, and the timing relays at each station then release in the normal order, relay L1 being the last to release.

If an indication code is terminated on an even-numbered step prior to the sixteenth step, due to the failure of relay T to pick up, relay OR remains normal until the timing relays OL2, OLP, OLB and OLBP release, the closing of back contact f of relay OLBP completing a circuit for operating relay OR to reverse extending from terminal B at front contact d of relay PCP, back contacts f of relays OL2 and OLBP, front contact b of relay PCP, front contact f of relay PC and back contacts e of relays X, OM and OT through relay OR to terminal O.

At the transmitting station, relay R remains picked up and the timing relays L2, LP and LB release. Relay LB releases relay M and reverses the connections for relay R so that relay R releases, reenergizing the timing relays which then release in the order L1, LP, LB and LBP, the apparatus assuming the same condition as at the other stations where relay R and the timing relays stand released, with relay R2 picked up.

At the office, relay OR is reversed upon the release of relay OLBP, and since the pick-up circuit for relay PC is closed when its stick circuit opens, relay PC remains picked up. The office timing relays are reenergized and then release in the order OL1, OLP, OLB and OLBP, relay OL2 remaining picked up. Relay OR is restored to normal upon the closing of back contact f of relay OLBP over the circuit above traced which includes front contacts of relays PC, PCP and OL2, and back contacts of relays OLBP and OL1. When relay OR is restored to normal, the office timing relays are reenergized and relay PC deenergized, relay PC releasing before relay OLBP picks up. The office timing relays then release in the normal order, and relay PC restores the line polarity to normal to pick up the station line relays, the station timing relays being reenergized and releasing in the normal order, as in the preceding examples.

It will be seen that in each case, regardless of their initial positions, the line relays OR and R are all restored to normal at substantially the same time so that each releases its timing relays in the normal order to place all of the coding units in the proper receiving condition before relay OL1 or any of the relays L1 release to permit the initiation of the next code. Generally the office has a preferred chance to send the next code because relay OL1 releases slightly before the relays L1 release.

It has already been explained that if due to a fault, an indication code is interrupted after the station starting relay ST is reenergized, relay ST will be released again due to the release of relay LB before relay M releases. It will be clear, therefore, that each interrupted indication code will be reinitiated for transmission in its entirety after the line becomes again available. This is true of a control code only in the event the interruption occurs before the office starting relay ST is released, as occurs on the eighth step of the station code call. Otherwise a second operation of the starting button STB is required.

It may also happen that relay OR is operated by one or more impulses of foreign current, or as the consequence of a temporary line cross or open when the system is in its normal at rest condition. In this case the first reversal of relay OR picks up relay PC, reversing the line polarity and releasing the line relays R to prevent the initiation of a code by any station. When the interference terminates, the system restores itself to normal in the same manner as in the case of an interrupted indication code, as described above.

I shall next describe the means for preventing interference and for transmitting codes one at a time in the desired order, when two or more transmitters have codes stored for transmission. The inclusion of the back contacts b of relays L1 and L2 in the pick-up circuit for each relay M, and the provision of a similar circuit for relay OM, prevents the initiation of a code except when the line is free, as has already been made clear, but it may readily happen that the office and one or more stations initiate codes at substantially the same time. If relay OM picks up, the control code will prevail, since the back contact b of relay OM will open the circuit for relay PC and the long line open step generated by relay OT will hold the line relays R released to pick up the delivery control relay CD at each station as in the control code already described. At any station at which relay M has been picked up to initiate an indication code, when relay CD picks up, the opening of its back contact e disconnects terminal B from wires 118 and 168 and relay M is thereby released. Consequently all station coding units are conditioned to receive the control code on the first step, the indication codes being stored for transmission subsequently.

In the event the coding units at two or more locations initiate indication codes at the same time and by their joint action place the office coding unit in the receiving condition, the shunts applied to the line by that relay T which is nearer the office will govern the operation of the line relays R at more remote locations as well as that at the same location, and the relays T will operate in unison as long as corresponding steps of the respective code calls are of like character. When one relay T holds a shunt applied to the line to generate a long odd-numbered step, it will overrule any relay T which releases at a more remote location for which the code call requires a short step, and when relay T at the nearer station picks up to apply a shunt to the line, terminating a short even-numbered step, it will overrule any relay T which is held down at a more remote station as required for a long step. In either case, the relays R and T at the more remote locations will occupy their released positions simultaneously on one of the steps of the station code call for a time sufficient to energize a lockout circuit extending from terminal B at the right-hand contact a of relay R, Fig. 2A, back contact e of relay 16, front contact b of relay LBP, wire 119, back contact d of relay T, front contact j of relay M, wire 166, back contact j of relay CR, back contact c of relay 1 through the delivery control relay CD to terminal C. Relay CD will therefore pick up and by opening its back contact e will disconnect terminal B from wires 118 and 168, releasing the associated relay M. Since the line is now supplied with current of reverse polarity, the release of relay M renders the associated relay R at the inferior station non-responsive to the remainder of the code, causing the timing relays L and the energized counting relay at that station to release, its code being stored for subsequent transmission when the line is again free.

It will be seen therefore in respect to line action, a long odd-numbered step takes precedence over a short one and a short even-numbered step takes precedence over a long one. For this reason it is desirable to assign the code calls to the several locations in a geographical order so that each call is superior to those for more remote locations and inferior to those for stations nearer the office. In respect to line action, the order of superiority of the code calls is as shown by the following table, in which each code call is superior to those below it in the same column and to all those in other columns at the right.

| 357 | 368 | 578 | 458 | 235 | 257 | 268 |
| 358 | 345 | 567 | 456 | 237 | 258 | 245 |
| 356 | 347 | 568 | 478 | 238 | 256 | 247 |
| 378 | 348 | 678 | 467 | 236 | 278 | 248 |
| 367 | 346 | 457 | 468 | 234 | 267 | 246 |

It will be noted that a different order prevails when the codes are transmitted from the same location, in which case a long step takes precedence over a short step. For example, if all the office starting buttons are operated at the same time, the code call 234 will be the first, and 678 the last to be transmitted.

It is sometimes desirable to employ the code calls of which the first digit is 2 at locations other than in the normal sequence as given in the table above. In order to provide this facility, the modification of Fig. 5 may be used, in which a secondary transmitter relay TS is provided at the control office.

In this modification the station code calls are preferably limited to those for which the first digit is 2 or 3, in order to provide ample time for the operation of relay TS. This relay operates upon the reversal of relay OR to begin the third step, but only if a short second step is received, and serves to open the line circuit on the third step to lock out any station which is attempting to transmit a long second step. It follows that code calls including a long second step, that is to say, those having 2 as their first digit, retain their inferior status whereby the stations using them may be locked out, regardless of the geographical location of these stations. Consequently, they may be used at locations nearer the office, or interspersed among other stations, or on a branch line, or at points in the opposite direction from the office, without interference with the use of the line by stations using the code calls having 3 as the first digit.

In all these arrangements it is to be understood that the code calls having the same first digit are assigned in the order given in the table, to the stations within the group.

Figure 5:
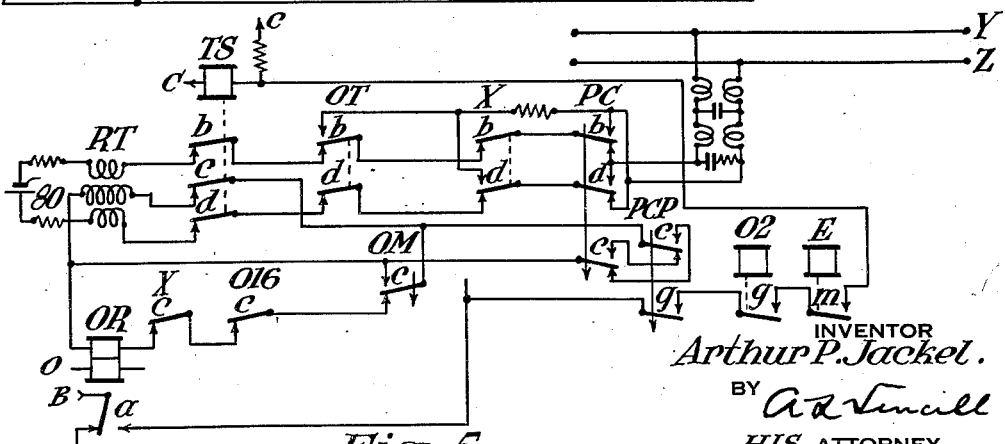
Fig. 5 illustrates another modification of a portion of the office coding unit of Fig. 1A, comprising a circuit for controlling a secondary transmitter relay TS which may be used when the control office is located at an intermediate point in the line, or to meet other special line conditions.

Referring now to Fig. 5, it is to be understood that this view is similar to the corresponding portion of Fig. 1A, except for the addition of relay TS and its energizing circuit, this arrangement being an improvement upon that shown in Fig. 8 of the Baughman et al. Patent No. 2,303,875, hereinbefore referred to.

When two stations initiate indication codes at the same time, one having a code call with 3 as the first digit and the other with 2 as the first digit, the former will prevail and relay OR will be operated to the right after a time corresponding to a short second step, thereby completing a circuit momentarily at the beginning of the third step of the code as received at the office, which circuit extends from terminal B at the righthand contact a of relay OR, front contacts g of relays PCP and 2, front contact m of relay E through relay TS to terminal C.

Relay TS picks up and then releases, its circuit being opened upon the release of relay O2 on the same step. Contacts b and d of relay TS open the line circuit for a time sufficient to release the line relay R at the station transmitting the long second step and to render the lockout circuit at that station effective as above described to stop further transmission from that station, and contact c of relay TS disconnects relay OR from transformer RT to prevent its operation to normal in response to the interruption of the line current by relay TS. When relay TS releases, the closing of its back contact c allows relay OR to receive a reverse current impulse from transformer RT, but as this occurs only during a long third step when relay OR occupies its reverse position it is without effect.

It will be understood that in response to the long third step, a first selector relay 3F is picked up over wire 23, Fig. 1C, and contact c of relay E. Contact j of relay F opens, thereby releasing relay E. In Fig. 5, contact m of relay E opens and holds the circuit for relay TS open for the remainder of the code.

It may be assumed that the station which was locked out as above described will transmit its code next in order. Relay TS is not operated during the reception of a code in which the first digit of the code call is 2, for the reason that the first selector relay 2F will be operated, and consequently relay E will be released on the long second step of such code, so that when relay OR reverses to begin the third step, the circuit for relay TS is open at contact m of relay E.

In order to provide a further safeguard against the transmission of indication codes from two stations at the same time, in the event of a fault, an additional lockout relay X is provided at the office in accordance with a feature of my invention.

Relay X serves to interrupt the transmission in the event a code call is received which contains more than three digits. For example, it may be assumed that one station may be allowed to transmit the code call 235 and another the code call 245, at the same time. If this occurs the selector relay 234S will be operated on the fourth step to select a panel which belongs to neither station, and relay OCD, Fig. 1B, will be operated on the next step, the fifth in this instance, as hereinbefore described. When relay OCD picks up, its contacts b and d shift the connections of wires 63 and 64 from the d contacts of the counting relays to wire 57, and if the fifth step is long, a circuit is completed from terminal B at back contact d of relay OL1 and wire 63 to wire 57 through relay X to terminal C, relay X picking up to complete a stick circuit over its contact a. Relay X will also pick up on the seventh step over the circuit described, if this is the fourth digit of the received code call. Relay X may likewise be picked up on the sixth step, over the circuit extending from terminal B over back contact d of relay OL2, wire 64, back contact d of relay OCR and front contact d of relay OCD to wire 57. On the eighth step, relay OCR picks up, opening the circuits traced above to prevent the operation of relay X during the second cycle of operation of relays 5, 6 and 7, and prepares a circuit for operating relay X in case this step is the fourth long step of a received code call, which extends from terminal B over wire 64, front contact d of relay OCR, front contact e of relay 8, and front contact d of relay OCD to wire 57 and thence through relay X to terminal C.

It follows that if a code call is received containing more than three long steps, relay X is picked up on the fourth of these long steps received. When relay X picks up, it opens the line circuit at its contacts b and d to release the line relays R at the transmitting stations if these are picked up, thereby interrupting the indication code. The opening of its back contact c disconnects relay OR from transformer RT and the closing of its front contact e connects relay OR to terminal B to operate relay OR to reverse.

Relay OR is held reversed by relay X until relay OLBP releases, whereupon relay X is released, and relay OR is restored to normal over the circuit already traced which includes front contacts of relays PC, PCP and OL2 and back contacts f of relays OLBP and OL1. All the line relays R and all the station timing relays except the relays L2 now stand released, due to the reversed polarity of the line current, the relays M at the transmitting stations having been released by the operation of relay X. When relay OR is restored to normal, the office timing relays are reenergized and relay PC released, and the office timing relays then release in the normal order. The release of relay PC restores the line polarity to normal so that the line relays R pick up reenergizing their timing relays, and the timing relays at each station then release in the normal order.

It will be clear from the foregoing that no interference occurs when a plurality of starting relays ST at the office and stations are released at the same time, or when the line is in use, and that the codes will be transmitted one at a time in order in accordance with the relative superiority of their respective code calls.

The system of my invention also includes provisions for preventing those stations having superior code calls from monopolizing the use of the line under conditions of heavy traffic, or in the event the station starting relay ST fails to pick up at the end of a code, comprising the provision of a station sequence relay SS in each station storage unit. Relay SS serves to prevent the initiation of a second indication code by any station storage unit which has transmitted a code as long as any other station storage unit has a code stored for transmission. This feature is an improvement upon the arrangements for the same purpose shown in Letters Patent of the United States to Snavely et al., Nos. 2,273,231 and 2,273,383, dated February 17, 1943, for Remote control systems.

Referring to Fig. 2C, it will be seen that relay SS is picked up on the step representing the third digit of the station code call, over front contact $h$ of relay MSP, and relay SS is then held energized over a stick circuit including its own front contact $a$ and back contact $h$ of the associated delivery relay D, wire 165 extending to terminal B at front contact $f$ of relay L1 or L2, which circuit is opened by relay L1 when the system assumes its normal at rest condition at the end of a code. Relay SS is slow to release and its back contacts $b$ and $c$ hold the starting circuit open and also those which govern the transmission of the station code call for an additional interval following the restoration of the apparatus to its normal at rest condition, during which another station may initiate a code, and thereby hold relay SS picked up. It follows that when relay SS has been picked up, the station coding unit is rendered incapable of initiating a second code until after the line has been free for a time which is longer than the normal interval between successive codes. Each storage unit having a code stored, at which relay SS has not been actuated, is given access to the line upon the release of relay L1 at the end of a code. Consequently each such storage unit will transmit one code during which its relay SS becomes energized. At the end of this series of codes, a longer period will elapse to allow the relays SS to release, whereupon the station units will be again conditioned to transmit codes one at a time in sequence.

In the event a control code is interposed in a sequence of indication codes as above described, for the purpose of operating a particular device, if the relay SS of the station unit governing such device has been picked up it will be released by the operation of the delivery relay D in response to the control code, and the unit will be thereby conditioned to indicate the condition of the operated device more promptly.

It will also be evident that each relay SS serves also to prevent continued initiation of incomplete codes by a station storage unit due to a fault, if other units have codes stored for transmission, provided the fault is not of such a nature as to prevent relay SS from becoming energized, as would be the case, for example, if the code transmitted by a station coding unit having a superior code call does not progress far enough to pick up the station relay S at that station, due to a fault.

To protect against this and other conditions, a thermal relay COR is provided, arranged as shown in Fig. 2A. Relay COR is energized whenever an indication code is initiated by the storage unit, from the time the starting relay ST releases to store a code for transmission until such code is fully transmitted. Relay SS is picked up by relay MSP on the station selecting step of the code, and until relay SS picks up, relay COR is energized over the circuit extending from terminal B over back contacts $b$ of relays ST and SS, wire 147, front contact $b$ of relay RP and back contact $a$ and the heating element of relay COR to terminal C. When relay MSP picks up it remains energized until the end of the code and provides a connection from terminal B to wire 147 at its front contact $j$ for energizing relay COR.

The time of energization of relay COR may exceed the time required to transmit a code from the associated storage unit, even if no fault exists, by the time required to transmit one code from each storage unit having a more superior code call, which interval, in practice, but rarely exceeds one minute. On the other hand, in the event of a fault which prevents the reenergization of relay ST, relay COR is energized substantially continuously. Relay COR is made selectively responsive to a fault by adjusting it to open its contact $a$ after it has been energized for a time interval of about two minutes, the opening of its contact $a$ deenergizing its heating element and also the pick-up circuit for relay M. Contact $a$ of relay COR is of the snap action type and remains open for about two minutes, and after reclosing, if terminal B remains connected to wire 147, will operate cyclically with closed periods of one minute and open periods of two minutes, approximately. It follows that relay COR operates in such a manner as to prevent the defective transmitter from obtaining access to the line for periods of about two minutes during each three minute interval, as long as the fault persists.

The system of my invention also includes a fault relay RPP by means of which any station coding unit may be readily isolated from the line, as is of utility for example in the event of a short circuit in the line connections or in case of faulty operation due to abnormally low local battery voltage, or to terminate the cyclic operation of relay COR, this feature being disclosed and claimed in a copending application for Letters Patent of the United States, Serial No. 468,224, filed December 8, 1942, by G. W. Baughman, for Remote control systems, now Patent No. 2,376,569, issued May 22, 1945. Relay RPP is a slow release relay which is maintained normally energized by a stick repeater relay RP of the line relay R. Relay RP is operated in accordance with the code operation of relay R, as long as relay RPP remains picked up. In the normal operation of the system relay R remains steadily released for a maximum time of about three seconds, this being the time required to transmit an indication code from another station. Relay RPP is made sufficiently slow release to bridge this time interval by connecting the electrolytic condenser C2 across its terminals. The energy stored in condenser C2 provides a release period of about five seconds, so that relay RPP will not release unless relays R and RP remain released for an abnormal length of time, as would be the case if a short circuit developed between the front and back contacts $d$ of relay M, for example.

Relay RPP at each station may be released manually from the office by pressing the disconnect button DB of Fig. 1A, for a suitable length of time, say fifteen seconds, thereby releasing relays R, RP and RPP, in turn. When relay RPP releases the resistor W1, in series with relay R, is short circuited by its contact b, and at the same time contact a of relay RPP opens to insert a similar resistor W8 into the circuit for relay R at a point adjacent the line wires Y and Z. It follows that if the system is in capacitated due to a short circuit within the coding unit the line fault is removed by the insertion of a relatively high resistance in series therewith, the resistors W1 and W8, in practice, usually having a value of around 10,000 ohms each. The transmitting portion of the coding unit is thus effectively isolated from the system, and at the same time the starting circuit including wire 147 is opened at contact b of relay RP to prevent the further energization of relays COR and M. At each station at which no fault exists, relay R will pick up in response to the release of the disconnect button DB, since as far as relay R is concerned, the effect of the release of relay RPP is to merely replace the resistance W1 by an equivalent resistance W8 in its circuit. Relays RP and RPP however will remain released after relay R becomes energized, the circuit for relay RP being open at contact c of relay RPP, and that for relay RPP at contact a of relay RP.

The operator at the control office may now restore the system to operation, leaving one or more station coding units isolated, by transmitting control codes in turn to each of the coding units which he desires to include in the system as restored. On the ninth step of a control code, as hereinbefore described, the closing of back contact e of relay 8 completes a connection from terminal B to wire 115 to provide a circuit for the delivery relay D of the selected storage unit. A connection from wire 115 through the lower winding of relay RP provides a circuit for picking up relay RP, which relay in turn energizes relay RPP to complete the holding circuit for relay RP, thereby restoring the coding unit to normal operation. It will be evident that a control code will not be received by a station at which relay R is short circuited, for example, and that consequently such station will remain isolated.

In order to facilitate the restoration of the system as above described, a "recall" button RCB, Fig. 1B, is provided at the office by means of which the operator may send a special recall code to any station without operating any of the station devices, this recall code being terminated after the transmission of the station code call, that is to say, on step nine. The recall code is also effective to initiate the transmission of an indication code from the selected station, and thus provides means by which the operator may obtain new indications without causing any change in the condition of the station devices.

To initiate a recall code, the operator presses the recall button RCB and also the starting button STB of the control panel for the station to which the code is to be sent, thereby picking up the corresponding starting relay, such as relay 234ST, which in turn picks up relay OM as already described, whereupon a circuit is completed from terminal B at front contact g of relay OM, wire 69, contact a of button RCB through the recall stick relay RCR to terminal C, and relay RCR picks up, completing a stick circuit extending over its front contact a and wire 82 to terminal B at front contact e of relay OLBP. Button RCB may then be released and the transmission will continue through eight steps during which the office selector relay 234S and the corresponding relay S at the selected station will become energized as in the control code already described. When the ninth step is reached relay O1 does not pick up, its circuit being open at back contact b of relay RCR, and consequently relay OT is held energized over wire 168 until relay OLBP at the office and relay LBP at the selected station release.

At the selected station, when relay S picks up the normal stick circuit for relay ST is replaced by the temporary stick circuit extending from wire 113 to 114 over back contacts h of relays M and l and in parallel therewith, front contact d of relay LB. When relay l picks up on the ninth step, this circuit is opened by the release of relay LP. Relay D also picks up on the ninth step over wire 115, the opening of its back contact h causing relay SS to release if energized. The station coding unit is therefore placed in condition to initiate an indication code as soon as the line is again free. It will be seen that on the ninth step of the recall code, relay RCR is released by relay OLBP, and that the system is then in the same condition as when a control code is interrupted on an odd-numbered step, due to a fault. It follows that the system will be restored to normal by the same sequence of operations, as in the case of an interrupted control code as hereinbefore described.

In the foregoing step-by-step description of the operation of the system it has been assumed that only one storage unit is associated with each coding unit as indicated in Fig. 2C. It is the usual practice to include one storage unit in the case containing the station coding unit since at least one is always required, and to provide terminals for connecting to the coding unit one or more auxiliary storage units each comprising a suitable housing containing a group of five relays S, MSP, ST, D and SS, when the number of devices to be controlled or indicated exceeds the capacity of one storage unit, and to identify similar relays one from another by prefixing the code call numbers to the designation of the storage unit relays. For example, relay S of Fig. 2C responds selectively to the code call 234, and may be designated 234S like the office relay which responds to the same code call. The relays S of four auxiliary storage units designated 235S to 238S may then be connected to contacts c to f of relay GA, as shown more particularly in the left-hand portion of Fig. 3. In this case, a back contact of each of the relays 234S to 238S is included in the stick circuit for relay GA so that relay GA will be released in response to the last digit of any of the code calls 234 to 238 as required.

Each auxiliary storage unit also requires a connection from contact c of its relay S to a different one of the contacts g to k of relay GA, to effect the generation of its own code call, as indicated by the references 234 to 238 adjacent these contacts in Fig. 3. The remaining connections to each auxiliary storage unit are arranged like those of the one shown; that is to say, the remaining wires leading to the station coding unit are "bus wires" connected to correspondingly numbered terminals of each of the storage units in turn.

When one or more auxiliary storage units are connected directly to the station coding unit as above described, relay FA may be controlled on any of the steps two to five, and relay GA on any of the steps three to six which follow the one to which relay FA is assigned, as indicated in Fig. 2C. It will be readily apparent that the total number of storage units which may be controlled directly by the coding unit is limited to a single group of from one to five using code calls which differ only in respect to the third digit, there being fifteen such groups.

In a second arrangement, one or more pyramid units UB each including a pair of relays such as the relays FB and GB of Fig. 3, may be interposed between the coding unit and one or more additional groups of storage units using code calls all of which have the same first digit. When this second arrangement is used the circuits are arranged so that the energization of relay FA completes a connection from terminal B at its front contact c for energizing the relay FB of each pyramid unit on the same step, and a front contact a of each relay FB and a back contact j of each relay GB are interposed in the stick circuit for relay FA, the circuits controlled by relays FB and GB being in other respects similar to those controlled by relays FA and GA as above described.

It will be understood that when relays FA and GA are connected for operation on any two steps of the group two to seven as above described, a relay GB may be controlled on each succeeding step of that group. As shown, relay GB is connected over contact b of relay FB to wire 124 for operation on step four, and controls the group of S relays using the code calls 245 to 248. The relays GB of three additional pyramid units, not shown, may be similarly connected over contacts of their respective relays FB to wires 125 to 127 for operation on steps five to seven to control other groups of S relays using the code calls 256 to 258, 267 and 268, and 278, respectively.

In a third arrangement the capacity of the coding unit is expanded in a different way by interposing one or more pyramid units UC each comprising a group of three relays EC, FC and GC, to enable code calls having different first digits to be used. When this third arrangement is used, the circuits are arranged so that each relay EC is connected to wire 121 and is picked up on the first step of the code in unison with the office relay E over a similar circuit, and is held energized over a stick circuit connected to terminal B over its own contact a and wire 160, this circuit including back contact d of relay FA and of each relay FC so that relay EC releases when the first digit of a code call is received. Front contacts c and d of relay E, as shown, are interposed in the connections to wires 132 and 133, and relay FC is connected over contact b of relay EC to wire 123, for operation on the third step in the event relay FA is not operated on the second step, and renders relay GC responsive to the fourth step to control the group of S relays using the code calls 345 to 348, as shown. Three other units UC having their relays FC controlled on steps four to six may also be provided to utilize the code calls 456 to 458, 567 and 568, and 678, respectively.

Each relay FC may also control one or more pyramid units like UB as illustrated by the unit UD, of which the relays FD and GD are controlled by relay FC over circuits similar to those by which relay FA controls the relays FB and GB, as described. If relay FC is controlled on step three, relay GD may control a group of S relays using the code calls 356 to 358 as shown. Five other pyramid units similarly arranged permit the utilization of the code calls 367 and 368, 378, 467 and 468, 478, and 578, respectively.

It will be clear therefore that any or all of the thirty-five code calls may be used at a single location by interposing one or more pyramid units between the coding unit and the storage units as above described.

Referring now to Fig. 4, this view shows a modification of the office coding unit arranged to permit joint use of the line wires Y and Z by the time code system of my invention and by a dispatcher's telephone circuit equipped with call selectors, this arrangement being an improvement upon that disclosed in an application for Letters Patent of the United States, Serial No. 401,092, filed July 5, 1941, by G. W. Baughman and N. F. Agnew, for Remote control systems, now Patent No. 2,332,191, issued October 19, 1943. As shown, the selector system is to be understood to be that of Letters Patent of the United States No. 1,343,256, granted June 15, 1920, comprising a plurality of code wheels J, of which but one is shown, by means of which the dispatcher may transmit impulse codes to selectively call various way stations to establish telephone communication therewith. Each code wheel J when wound up and released makes one revolution during which a connector relay JB is energized to connect a source of direct current over the contacts of a pole changer relay JPC to the primary of an impulse transformer JT, and as the code wheel rotates relay JPC is intermittently energized over a circuit including a contact operated by the code wheel to deliver a code of impulses of alternately opposite polarity to transformer JT.

The modifications of the office coding unit shown in Fig. 4 include the addition of a connector relay JBA, energized in parallel with relay JB, a repeater relay JBAP, a stick repeater MP of the office master relay OM, and the provision of a circuit including wire 67 for controlling the office starting relays ST. In other respects the circuits are similar to those of Fig. 1A, and the normal operation of the time code control system is similar to that already described in detail.

The dispatcher is free to release a code wheel at any time, to transmit a selector code, regardless of whether or not the line is in use by time code system. The release of the code wheel energizes relays JB and JBA and then relay JBA opens its contact a in the circuits for relays OM and PC, and closes its contact c to complete a circuit from terminal B at back contact c of relay MP through relay JBAP to terminal C, so that relay JBAP picks up. The opening of back contacts b and d of relay JBAP disconnects battery 80 from the line wires Y and Z and the closing of its front contact a completes the circuit for the secondary of transformer JT to enable the selector code to be delivered to the line, the code wheel J being so arranged that the first operation of the code transmitter relay JPC is delayed for at least one second after relay JPC picks up.

During the transmission of the selector code, relay OR is disconnected from transformer RT by the opening of back contact c of relay JBAP and is held reversed due to the closing of the connection to terminal B at front contact e of relay JBAP so that the timing relays OLBP and LBP release, relays OL2 and L2 remaining picked up to prevent the initiation of a code by the time code system.

The selector code delivered to the line through transformer JT comprises a series of short impulses of alternately opposite polarity, including two spaced pauses. The station line relays R respond only to alternate ones of these impulses, that is to say, only when line Y is positive, but none of the selector codes contain the arrangement of long and short steps characterizing the station code calls of the time code system and none of the S relays becomes energized nor do the relays R remain energized long enough to release the relays L2.

At the end of the selector code relays JB and JBA release, the release of relay JBA causing relay PC to pick up and relay JBAP to release, and then relay PCP picks up. When relay JBAP releases to disconnect transformer JT and to reconnect battery 80 to the line circuit, the relays R remain released due to the reversal of line polarity by relay PC, and relay OR is held reversed until relay PCP picks up over the connection to terminal B at back contact b of relay PCP and front contact f of relay PC. Since all the timing relays except relay OL2 stand released, the energization of relay PCP restores relay OR to normal over a circuit already traced including front contact b of relay PCP and front contact f of relay OL2, thereby reenergizing the timing relays, but releasing relay PC before relay OLBP picks up, and then the timing relays and relay PCP release in the normal order with relay OL1 the last to release, while relay PC upon releasing restores the line polarity to normal to pick up the line relays R reenergizing their timing relays which then release in the normal order with relay L1 the last to release.

When a control code is initiated by the office coding unit of Fig. 4, relay MP is picked up over the connection to terminal B to wire 69 at front contact g of relay OM, and if a code wheel is released during the transmission of a control code, relay OM is released to stop further transmission by the opening of back contact a of relay JBA, but relay MP remains picked up until relay OLBP releases over a stick circuit extending over its own front contact a and wire 82 to terminal B at contact e of relay OLBP.

It may happen that a selector code is initiated to pick up relay JBA during a long line open step of a control code. In this case relay OR is in its reversed position and relay JBAP picks up at once over the circuit extending from the right-hand contact a of relay OR over front contacts c of relays MP and JBA. Relay JBAP holds relay OR reversed and releases the line relays R, thereby releasing all the timing relays except relays OL2 and L2 as above described, and the system then restores itself to normal as the result of the energization of relays PC and PCP following the release of relay OLBP as hereinbefore described.

If relay JBA picks up during a line closed step of a control code, when relay OR is normal, the release of relay OM by relay JBA prevents relay OT from picking up to terminate the line closed step, which is thereby prolonged until relays OLBP and LBP release. When relay OLBP releases, relay MP becomes deenergized and releases, and upon closing its back contact c causes relay JBAP to pick up to open the line to terminate the step, releasing the line relays R and reversing relay OR, and placing the line under the control of the selector system. The time code system then assumes the same condition as in the first case and is restored to normal at the end of the selector code in a similar manner.

It will be seen that in either case the step during which relay JBA picks up is prolonged sufficiently to cause each station relay LBP and the relays it controls to release to stop further progression without operating any of the polar stick control relays, such as WS.

It may happen that the interruption of the control code occurs after the office starting relay which initiated the code has released. If the starting relay is relay 234ST, for example, it is held energized over back contact i of relay 234S until that relay picks up on the fourth step, and then over wire 46 and the front contact i of relay 234S, and relay 234ST is released by the opening of back contact f of relay 8 on the eighth step. If relay JBA then picks up, relay 234ST is reenergized over the circuit extending from terminal B over front contacts b of relays MP and JBA, wire 67, front contact k of relay 234S through relay 234ST to terminal C at the closed contact of button CB. It follows therefore that an interrupted control code will be transmitted in its entirety after the selector code is completed and the time code system regains control of the line.

It may also happen that a selector code will be initiated to pick up relay JBA when an indication code is being transmitted. In this case relay JBAP picks up at once, opening the line circuit to release the relays R, L1, LP, LB, M and LBP and the counting and selecting relays at the transmitting station, and energizing relay OR in the reverse direction to release the relays PC, OL1, OLP, PCP, OLB and OLBP and the office counting and selecting relays. When relay JBA releases at the end of the selector code, relay JBAP releases and relays PC and PCP are reenergized and the system is restored to normal as a result of the energization of relay PCP as in the other cases described.

It has already been explained that the station starting relay ST will occupy its released position at the end of an interrupted indication code due to the release of relay LB prior to the release of relay M. It follows that an interrupted indication code will be transmitted in its entirety after the selector code is completed and the time code system regains control of the line.

Although I have herein shown and described but one form of my invention and several modifications thereof, it will be understood that various changes and modifications may be made therein within the scope of the appended claims without departing from the spirit and scope of my invention.

Having thus described my invention, what I claim is:

1. In a remote control system, a line relay of the stick polar type operable to reverse and normal positions by impulses of alternately opposite polarity, a line circuit including a source of direct current, a transformer interposed between the winding of said line relay and said line circuit for supplying the relay with impulses of alternately opposite polarity when the line current is periodically varied in accordance with a multiple step code, a pole changer relay effective when energized to reverse the polarity of the current in said line circuit, a timing relay, means for energizing said timing relay when the line relay is operated periodically, the timing relay being adapted to remain in its energized position for a predetermined time interval after the line relay ceases to operate, which is longer than any time interval occurring in a code, a pickup circuit for the pole changer relay including a reverse contact of the line relay, a stick circuit for said pole changer relay including a front contact of the timing relay and a contact which opens after a number of operations of said line relay corresponding to a complete code, and means controlled by the timing relay for reversing the line relay if due to a fault such relay remains in its normal position for said predetermined time with the pole changer relay picked up, and for restoring the line relay to normal and then releasing the pole changer relay if due to a fault the line relay remains in its reverse position for said predetermined time interval.

2. In a remote control system, a line circuit, a normally deenergized line relay of the stick polar type, means for operating said relay to reverse and normal by codes of impulses received from said line circuit, a code receiver controlled by said relay and selectively responsive to said codes but only if said line relay is initially in its normal position, timing means controlled by said receiver and rendered effective after the lapse of a predetermined time for reversing the line relay if due to a fault an impulse other than the final impulse of a code, by which the relay is operated to normal, is not followed by another impulse, and other means controlled by said receiver for operating the line relay to normal if due to a fault an impulse by which the relay is reversed is not followed by another impulse within a predetermined time interval.

3. In a remote control system, an office and a plurality of stations connected by a line circuit, a code transmitter at each station adapted to deliver a code to said line circuit including a plurality of steps arranged to form a distinctive code call, the first of which steps is a relatively long step in each code transmitted from certain stations and a short step in each code transmitted from the other stations, lockout means at each of said certain stations effective when two or more stations initiate codes at the same time to interrupt the operation of the transmitter at such station in the event the line circuit is opened momentarily during the transmission of the long first step of its code call, a code receiver at the office, a secondary transmitter at the office effective when operated to open the line circuit, and means selectively controlled by said code receiver for momentarily operating said secondary transmitter when the second step of a code call is received but only if the first step of such code call is a short step.

4. In a remote control system, an office and a plurality of stations connected by a line circuit, a code transmitter at each station adapted to deliver a code to said line circuit including a plurality of steps arranged to form a distinctive code call, the first of which steps is a relatively long step in each code transmitted from certain stations and a short step in each code transmitted from the other stations, lockout means at each of said certain stations effective when two or more stations initiate codes at the same time to interrupt the operation of the transmitter at such station in the event the line circuit is opened momentarily during the transmission of the long first step of its code call, a code receiver at the office, a secondary transmitter at the office effective when operated to open the line circuit, and means selectively controlled by said code receiver for momentarily operating said secondary transmitter in response to the first short step of a received code call to lock out any of said certain stations which may have initiated codes at the same time during the first long step of their code calls.

5. In a remote control system, an office and a plurality of stations connected by a line circuit, a code transmitter at each station adapted to deliver a code to said line circuit including a group of selecting elements, a certain number of which have a particular character and the remainder a different character, thereby constituting a distinctive code call, a coding unit at the office for receiving the codes from said line circuit to control a plurality of selector relays, means for operating a series of such relays progressively in response to the elements of particular character in a code, all such series including the same number of relays but each having a different final selector relay the operation of which identifies a particular code call, a lockout relay, means for operating said lockout relay when due to a fault the number of elements of said particular character in such group of elements in a received code exceeds said certain number, said lockout relay being responsive to any element in said group provided it has said particular character and follows one to which a final selector relay has responded, and means responsive to the operation of the lockout relay for preventing further transmission of such code.

6. In a remote control system, a code receiver responsive to a group of selecting elements in a code certain of which have a particular character and the remainder a different character, thereby constituting a distinctive code call, a plurality of selector relays, one for each code call, means for energizing a particular selector relay after a predetermined number of elements of distinctive character in said group of elements have been received thereby identifying a particular code call, the succeeding elements of said group normally being of said different character, a lockout relay, means controlled by the energized selector relay for operating said lockout relay if due to a fault the received code includes an element of said particular character in the succeeding elements of said group of elements, and means controlled by the lockout relay when operated to prevent the further response of said receiver to such code.

7. In a remote control system comprising an office and a plurality of stations connected by a line circuit, a code transmitter at each station adapted to deliver a code to said line circuit including two groups of elements the first of which groups contains a certain number of elements of a particular character arranged to form a distinctive code call, the remaining elements in such group being of a different character, a code receiver at the office for receiving the codes from said line circuit, a selector relay for each different code call, means controlled by said receiver for operating each selector relay upon the reception of the last of said certain elements constituting the corresponding code call in said first group of elements, a delivery relay, means for operating said delivery relay during the reception of the next element of a code following the one during which a selector relay is operated, said delivery relay being effective when energized to condition said receiver to receive the second group of elements in said code, a lockout relay, circuits prepared by said delivery relay when energized for energizing the lockout relay if due to a fault any of the remaining elements of said first group are of said particular character, and means effective if said lockout relay becomes energized for interrupting the transmission of such code.

8. In a remote control system, a plurality of stations connected by a line circuit, a coding unit including a code transmitter at each station, a storage unit including a selector relay, a slow release relay, and a normally energized starting relay at each station, means at each station for controlling the order of delivery of the codes to the line circuit comprising a starting circuit effective when closed to initiate the operation of the associated code transmitter, said circuit including back contacts of the starting relay and slow release relay and contacts controlled by the coding unit which are closed only when the line has been free for at least a brief time interval between codes, a circuit controlling the character of certain elements of the transmitted code to selectively operate the associated selector relay including back contacts of the starting relay and slow release relay, circuits closed by the selector relay when energized in response to a transmitted code for picking up said starting relay and said slow release relay, a stick circuit for said starting relay including a movable contact free to be operated at any time to open such circuit, and a stick circuit for said slow release relay including contacts controlled by the coding unit which open the circuit when the line has been free for said brief time interval.

9. In a remote control system, a coding unit including a code transmitter for delivering different codes to a line circuit, a plurality of storage units for controlling the character of such codes, each including a selector relay, a slow release relay and a normally energized starting relay, means in each storage unit for controlling the order of delivery of the codes to the line circuit comprising a starting circuit effective when closed to initiate the operation of said code transmitter including contacts in the coding unit which are closed only when the line has been free for at least a brief time interval between codes, and having multiple connections to a source of current over back contacts of each starting relay and the associated slow release relay, circuits for controlling the character of the transmitted code so as to operate the selector relay of the storage unit having its starting relay and slow release relay released, said circuits being arranged so that when a plurality of starting relays are released and the associated slow release relays are also released the corresponding codes are transmitted one at a time in a given order, a circuit closed by each selector relay when energized in response to a transmitted code for picking up the associated starting relay and slow release relay, a stick circuit for each starting relay including a movable contact free to be operated at any time to open such circuit, and a stick circuit for said slow release relay including contacts controlled by the coding unit which hold the relay picked up until the line has been free for a time interval longer than the brief time interval during which another coding unit may initiate a code.

10. In a remote control system, an office and a plurality of stations connected by a line circuit, a coding unit including a code transmitter at the office and at each station, a storage unit for controlling and indicating the condition of a movable device including a selector relay, a delivery relay, a slow release relay, and a normally energized starting relay at each station, means at each station for controlling the order of delivery of codes to the line circuit by the stations comprising a starting circuit effective when closed to initiate the operation of the associated code transmitter, said circuit including back contact of the starting relay and slow release relay and contacts controlled by the coding unit which are closed only when the line has been free for at least a brief time interval between codes, a circuit for controlling the character of the transmitted code to selectively operate the associated selector relay including back contacts of the starting relay and slow release relay, circuits closed by the selector relay when energized in response to a transmitted code for picking up the starting relay and the slow release relay, a stick circuit for the starting relay including a contact controlled by said movable device, a stick circuit for the slow release relay including contacts adapted to hold the relay picked up until the line has been free for a time interval longer than the brief time interval during which another storage unit may initiate a code, means for operating the office code transmitter to deliver a code to the line circuit for selectively energizing said selector relay and for also energizing said delivery relay, each such received code being effective to control said movable device, and means controlled by the delivery relay when energized for releasing the slow release relay if energized to thereby condition the storage unit to transmit a code in response to the release of the starting relay by said movable device.

11. In a remote control system, a plurality of stations connected by a line circuit, a code transmitter at each station for delivering codes to a line circuit, means at each station for limiting the delivery of codes to the line circuit by the transmitter at that station in the event of a fault comprising a thermal relay, a starting circuit including a normally closed contact of the thermal relay, means for connecting a source of current to said circuit to initiate the operation of such code transmitter if the line is free, means for maintaining said source of current connected to said circuit substantially continuously until such code is fully transmitted, and means for energizing the thermal relay over a portion of said circuit including its own contact, said thermal relay being adjusted to open said contact after a relatively long period of energization and to close said contact after a relatively long period of deenergization.

12. In combination with a pair of line wires to which a remote control system normally has access, said remote control system comprising an office and a plurality of stations connected by a normally closed line circuit including said line wires and having a source of current at the office and a line relay at each station, said system including a code transmitter at the office for opening and closing the line circuit to generate code elements of selected lengths and a receiver at each station controlled by the line relay including a selector relay energized by the line relay in response to a distinctive combination of code elements and held energized only if the line relay continues to operate in response to the succeeding elements of the code, a plurality of code-controlled devices at each station rendered operable when the associated selector relay is energized, each such device being operated in response to a different operation of the line relay and in accordance with the character of the next preceding code element, a second code system having a connector relay and a repeating relay together with code transmitting means free to be operated at any time for energizing the connector relay, a circuit controlled by the connector relay for energizing the repeating relay, means controlled by the repeating relay when energized for disconnecting said source of current from the line wires to disable the remote control system and to connect the second code system transmitter to the line wires until the operation of such transmitter is completed, and means effective in the event said connector relay becomes energized during the transmission of a line closed element by said remote control system transmitter for preventing further operation thereof and for delaying the operation of said repeating relay to maintain the line closed for a time during which any selector relay which is energized will release due to the cessation of the operation of the associated line relay.

13. In combination with a remote control system having a normally closed line circuit including a source of current and a transmitting contact for periodically opening and closing said line circuits to tramsmit code elements, a connector relay free to be operated at any time, a repeating relay controlled by said connector relay for disconnecting said source of current from the line circuit until said connector relay is again released, and means for delaying the operation of said repeating relay if the connector relay is operated when a line closed code element is being delivered to the line circuit by said transmitting contact for a time sufficient to terminate the delivery of such element.

14. In combination with a remote control system including a coding unit for delivering different multiple step codes to a line circuit, a plurality of manually controllable starting relays, a selector relay for each starting relay, circuits controlled by each starting relay when energized for initiating the operation of said coding unit to transmit a multiple step code certain elements of which comprise a distinctive code call effective to selectively energize the corresponding selector relay, means controlled by each selector relay when energized for maintaining such selector relay energized until the end of the code and for releasing the associated starting relay, a connector relay free to be operated at any time, means controlled by said connector relay when operated for disconnecting the coding unit from the line circuit until the connector relay is again released, and means controlled by the connector relay if operated when a code is being transmitted by the coding unit and the starting relay by which the code was initiated has been released by the operation of the corresponding selector relay for reenergizing such starting relay to condition the coding unit to retransmit the interrupted code in its entirety following the release of the connector relay.

15. In combination with a remote control system including a coding unit having a master relay which when energized conditions the coding unit to deliver a multiple step code to a line circuit, a line relay, means controlled by the coding unit for reversing the line relay periodically in accordance with the code, a stick relay having a pick-up circuit closed when the master relay picks up and a stick circuit closed as long as the line relay is periodically operated, a connector relay free to be operated at any time, a repeating relay, an energizing circuit for said repeating relay closed when the connector relay is picked up having one branch closed when the stick relay is released and another branch closed when the stick relay is picked up and the line relay is in its reverse position, and means controlled by the repeating relay when energized for disconnecting the coding unit from said line circuit.

16. In combination with an electroresponsive device, a locally controlled relay for governing the energization of said device, a code controlled relay of the stick polar type effective in its normal position to prevent the energization of said device by said locally controlled relay, a code type communication system including line wires extending to a control office, a coding unit controlled over said line wires and responsive to codes received from said office for controlling said stick polar relay in accordance with the position of a control lever at said office, a code transmitter operable at times to deliver codes to said line circuit to which said coding unit is responsive for indicating the condition of said locally controlled relay at said office, a normally energized starting relay effective when released to initiate the operation of said code transmitter, a repeating relay, a pick-up circuit for the repeating relay including front contacts of the starting relay and of said locally controlled relay, a stick circuit for the repeating relay including its own front contact and the front contact of said locally controlled relay, a stick circuit for the starting relay including a contact which opens to release the starting relay in response to a change in position of the repeating relay, means for energizing said starting relay during the operation of the coding unit by said code transmitter to complete its stick circuit, and a circuit for locally restoring said polar stick relay to its normal position when said locally controlled relay is operated to deenergize said device, said circuit including a back contact of the locally controlled relay and a front contact of said repeating relay.

ARTHUR P. JACKEL.